United States Patent
Tonkovich et al.

(10) Patent No.: US 8,029,604 B2
(45) Date of Patent: Oct. 4, 2011

(54) METHODS FOR APPLYING MICROCHANNELS TO SEPARATE METHANE USING LIQUID ABSORBENTS, ESPECIALLY IONIC LIQUID ABSORBENTS FROM A MIXTURE COMPRISING METHANE AND NITROGEN

(75) Inventors: Anna Lee Y. Tonkovich, Dublin, OH (US); Robert D. Litt, Westerville, OH (US); Qiu Dongming, Dublin, OH (US); Laura J. Silva, Plain City, OH (US); Micheal Jay Lamont, Plain City, OH (US); Maddalena Fanelli, Plain City, OH (US); Wayne W. Simmons, Plain city, OH (US); Steven Perry, Galloway, OH (US)

(73) Assignee: Velocys, Inc., Plain City, OH (US)

( * ) Notice: Subject to any disclaimer, the term of this patent is extended or adjusted under 35 U.S.C. 154(b) by 472 days.

(21) Appl. No.: 12/184,843

(22) Filed: Aug. 1, 2008

(65) Prior Publication Data
US 2009/0071335 A1    Mar. 19, 2009

Related U.S. Application Data

(60) Provisional application No. 60/962,786, filed on Aug. 1, 2007.

(51) Int. Cl.
    *B01D 53/14*    (2006.01)
(52) U.S. Cl. .............. 95/178; 95/210; 95/211; 95/237
(58) Field of Classification Search ............. 95/130, 95/143, 145, 172, 156, 903; 96/274
    See application file for complete search history.

(56) References Cited

U.S. PATENT DOCUMENTS

| | | | | |
|---|---|---|---|---|
| 3,225,517 | A * | 12/1965 | Wachsmuth | 95/122 |
| 3,710,547 | A * | 1/1973 | Nelson | 95/99 |
| 5,504,968 | A | 4/1996 | Pressley | |
| 6,508,862 | B1 * | 1/2003 | Tonkovich et al. | 95/106 |
| 6,579,343 | B2 * | 6/2003 | Brennecke et al. | 95/51 |
| 7,125,540 | B1 * | 10/2006 | Wegeng et al. | 423/650 |
| 7,250,074 | B2 * | 7/2007 | Tonkovich et al. | 95/130 |

(Continued)

FOREIGN PATENT DOCUMENTS

CA    2 647 263    10/2007

(Continued)

OTHER PUBLICATIONS

Staudinger, et al., A critical compilation of Henry's law constant temperature dependence relations for organic compounds in dilute aqueous solutions, Chemosphere, Aug. 2001, pp. 561-576, retrieved from http://www.sciencedirect.com, Dec. 12, 2008.

*Primary Examiner* — Duane Smith
*Assistant Examiner* — Ives Wu
(74) *Attorney, Agent, or Firm* — Taft Stettinius & Hollister LLP

(57) ABSTRACT

Methods of using microchannel separation systems including absorbents to improve thermal efficiency and reduce parasitic power loss. Energy is typically added to desorb methane and then energy or heat is removed to absorb methane using a working solution. The working solution or absorbent may comprise an ionic liquid, or other fluids that demonstrate a difference in affinity between methane and nitrogen in a solution.

22 Claims, 27 Drawing Sheets

U.S. PATENT DOCUMENTS

| | | |
|---|---|---|
| 7,527,775 B2 * | 5/2009 | Chinn et al. ............ 423/226 |
| 2005/0045030 A1 | 3/2005 | Tonkovich et al. |
| 2006/0251558 A1 | 11/2006 | Chinn et al. |
| 2007/0161095 A1 | 7/2007 | Gurin |
| 2009/0018348 A1 | 1/2009 | Zahn et al. |

FOREIGN PATENT DOCUMENTS

| | | |
|---|---|---|
| WO | WO 2006/010068 | 1/2006 |
| WO | PCT/US08/09352 | 8/2008 |
| WO | WO 2009/018348 | 2/2009 |

\* cited by examiner

METHODS FOR APPLYING MICROCHANNELS TO SEPARATE METHANE USING LIQUID ABSORBENTS, ESPECIALLY IONIC LIQUID ABSORBENTS FROM A MIXTURE COMPRISING METHANE AND NITROGEN

CROSS REFERENCE TO RELATED APPLICATION

This application claims the benefit of U.S. Provisional Application No. 60/962,786, filed Aug. 1, 2007, which is incorporated by reference.

STATEMENT REGARDING FEDERALLY SPONSORED RESEARCH

This invention was made with Government support under Contract DE-FC26-03NT41905 awarded by the United States Department of Energy. The Government has certain rights in this invention.

BACKGROUND OF THE INVENTION

The present invention relates to methods of using separating methane from a mixture containing methane and nitrogen, and, in particular, to methods of separating methane from a mixture containing methane and nitrogen using microchannels and ionic liquid absorbents.

Gas-liquid reaction systems are known. See, e.g., Matthew W. Losey et al., "Microfabricated Multiphase Packed-Bed Reactors: Characterization of Mass Transfer and Reactions," Ind. Eng. Chem. Res. 2001, 40, 2555-2562. Anthony et al. ("Solubilities and Thermodynamic Properties of Gases in the Ionic Liquid 1-n-Butyl-3-methylimidazolium Hexafluorophosphate", Anthony, J., Maginn, E., and Brennecke, J., J. Phys. Chem B 2002, 106, 7315-7320) describe one example of an ionic liquid that suggests a single stage separation of methane and nitrogen are possible. U.S. Pat. No. 6,579,343, which is incorporated by reference, discusses the use of ionic liquids for gas separations.

The use of wicks or capillary structures for thin film is described in U.S. Pat. Nos. 6,875,247 and 7,051,540, which are incorporated by reference. Surface features for multiphase processing are described in U.S. Patent Application Publication No. 2007/0085227, which is incorporated by reference.

Foam flow is discussed in three articles by Stemmet et al.: Stemmet, C. P., Jongmans, J. N., van der Schaaf, J., Kuster, B. F. M., Schouten, J. C., "Hydrodynamics of gas-liquid counter-current flow in solid foam packings," Chemical Engineering Science, 60, 6422-6429, 2005; Stemmet, C. P., van der Schaaf, J., Kuster, B. F. M., Schouten, J. C., "Solid Foam Packings for Multiphase Reactors—Modelling of Liquid Holdup and Mass Transfer," Trans. ChemE, Part A, Chemical Engineering Research and Design, 84 (A12), 1134-1141, 2006; and Stemmet, C. P., Meeuwse, M., van der Schaaf, J., Kuster, B. F. M., Schouten, J. C., "Gas-liquid mass transfer and axial dispersion in solid foam packings," Chemical Engineering Science, 62, 5444-5450, 2007.

INTRODUCTION TO THE INVENTION

The application of microchannel separation systems using absorbents represents an opportunity for improved efficiency by integrating a complete system and reducing parasitic power losses. Energy is typically added to desorb methane and then energy or heat is removed to absorb methane using a working solution. The working solution or absorbent may comprise an ionic liquid, or other fluids that demonstrate a difference in affinity between methane and nitrogen.

An ionic liquid is one absorbent option that can be used in its pure form or in conjunction with water or other solvents. Ionic liquids typically have a relatively low (below 100° C.) melting point and are typically liquid at room temperature.

In a first aspect, a method for separating gaseous components according to the present invention may include contacting a gaseous mixture including methane with an ionic liquid by flowing the gaseous mixture and the ionic liquid through a microchannel; absorbing at least a portion of the methane by the ionic liquid, thereby creating a resultant mixture including a resultant gas and the ionic liquid; directing the resultant gas away from the ionic liquid; and desorbing at least a portion of the methane from the ionic liquid by changing the temperature of the ionic liquid.

In a detailed embodiment of the first aspect, the step of desorbing at least a portion of the methane may include raising the temperature of the ionic liquid. In another detailed embodiment of the first aspect, the step of desorbing at least a portion of methane may include lowering the temperature of the ionic liquid. In yet another detailed embodiment of the first aspect, the step of desorbing at least a portion of the methane may include lowering the pressure of the ionic liquid. In still another detailed embodiment of the first aspect, the method may include the step of changing the temperature of the ionic liquid prior to the step of absorbing at least a portion of the methane.

In another detailed embodiment of the first aspect, the step of desorbing at least a portion of the methane may include raising the pressure of the ionic liquid. In a further detailed embodiment, the step of changing the temperature of the ionic liquid may include lowering the temperature of the ionic liquid. In another further detailed embodiment, the step of changing the temperature of the ionic liquid may include raising the temperature of the ionic liquid. In still another further detailed embodiment, thermal energy extracted from the ionic liquid in one of the desorbing and changing the temperature steps may be supplied to the ionic liquid in the other of the desorbing and changing the temperature steps.

In another detailed embodiment of the first aspect, the microchannel may include at least one flow mixing feature. In a further detailed embodiment, the flow mixing feature may include a porous packed bed including at least one of rings and spheres. In another further detailed embodiment, the flow mixing feature may include a porous foam, felt, wad and/or other porous structure continuous for at least a length greater than a length of three hydraulic diameters of the microchannel, wherein the porosity is less than one.

In another detailed embodiment of the first aspect, the contacting step may include flowing the gaseous mixture and the ionic liquid co-currently through the microchannel. In yet another detailed embodiment of the first aspect, the contacting step may include flowing the gaseous mixture counter-currently to the ionic liquid through the microchannel.

In still another detailed embodiment of the first aspect, the microchannel may include a foam, wad, and/or mesh. In a further detailed embodiment, the flowing step may include wetting the foam, wad, and/or mesh with the ionic liquid. In another further detailed embodiment, the microchannel may include a foam constructed from aluminum, carbon, copper, nickel, stainless steel, alumina, silicon carbide, and/or other structurally sound foam or other porous material. In yet another further detailed embodiment, the microchannel may include a foam coated with a material to increase the wetting over the underlying material. In still another further detailed embodiment, the microchannel may include a plurality of foams having different pore densities.

In another detailed embodiment of the first aspect, the gaseous mixture may include nitrogen. In a further detailed embodiment, the resultant gas may include nitrogen.

In another detailed embodiment of the first aspect, the gaseous mixture may include carbon dioxide.

In a second aspect, a processing system according to the present invention may include a first microchannel including a first absorbent inlet, a first absorbent outlet, a feed stream inlet, and a first resultant gas outlet; a second microchannel including a second absorbent inlet, a second absorbent outlet, and a second resultant gas outlet, the second microchannel being arranged in a counterflow arrangement relative to the first microchannel; an absorbent circulating through the first microchannel and the second microchannel. The absorbent may have a temperature T1 at the first inlet, a temperature T2 and the first outlet, a temperature T3 at the second inlet, and a temperature T4 at the second outlet. At least one of the following conditions may be satisfied: T2 is greater than T3 and T1 is greater than T4.

In a detailed embodiment of the second aspect, the absorbent may have a Henry's law constant that increases with temperature and T4 may be greater than T2. In another detailed embodiment, the feed stream inlet may receive a mixture including methane and nitrogen, the first resultant gas outlet may exhaust a first resultant gas having a higher concentration of nitrogen than the mixture, and the second resultant gas outlet may exhaust a second resultant gas having a higher concentration of methane than the mixture.

In another detailed embodiment of the second aspect, a difference between T1 and T4 may be less than 10 C. In a further detailed embodiment, the difference between T1 and T4 may be less than 5 C. In a still further detailed embodiment, the difference between T1 and T4 may be less than 2 C. In a further detailed embodiment, the difference between T1 and T4 may be less than 1 C.

In another detailed embodiment of the second aspect, a difference between T2 and T3 may be less than 10 C. In a further detailed embodiment, the difference between T2 and T3 may be less than 5 C. In a still further detailed embodiment, the difference between T2 and T3 may be less than 2 C. In a further detailed embodiment, the difference between T2 and T3 may be less than 1 C.

In a third aspect, a processing system according to the present invention may include a first microchannel including a first absorbent inlet, a first absorbent outlet, a feed stream inlet, and a first resultant gas outlet; a second microchannel including a second absorbent inlet, a second absorbent outlet, and a second resultant gas outlet, the second microchannel being arranged in a counterflow arrangement relative to the first microchannel; an absorbent circulating through the first microchannel and the second microchannel. The absorbent may have a temperature T1 at the first inlet, a temperature T2 at the first outlet, a temperature T3 at the second inlet, and a temperature T4 at the second outlet. At least one of the following conditions may be satisfied: T3 is greater than T2, T4 is greater than T1, and T2 is greater than T4.

In a detailed embodiment of the third aspect, a difference between T1 and T4 may be less than 10 C. In a further detailed embodiment, the difference between T1 and T4 may be less than 5 C. In a still further detailed embodiment, the difference between T1 and T4 may be less than 2 C. In a further detailed embodiment, the difference between T1 and T4 may be less than 1 C.

In another detailed embodiment of the third aspect, a difference between T2 and T3 may be less than 10 C. In a further detailed embodiment, the difference between T2 and T3 may be less than 5 C. In a still further detailed embodiment, the difference between T2 and T3 may be less than 2 C. In a further detailed embodiment, the difference between T2 and T3 may be less than 1 C.

The foregoing is a summary and thus contains, by necessity, simplifications, generalization, and omissions of detail; consequently, those skilled in the art will appreciate that the summary is illustrative only and is not intended to be in any way limiting. Other aspects, features, and advantages of the devices and/or processes and/or other subject matter described herein will become apparent in the teachings set forth herein.

BRIEF DESCRIPTION OF THE SEVERAL VIEWS OF THE DRAWING

The detailed description particularly refers to the accompanying Figures in which.

DETAILED DESCRIPTION OF THE INVENTION

Figure 1:
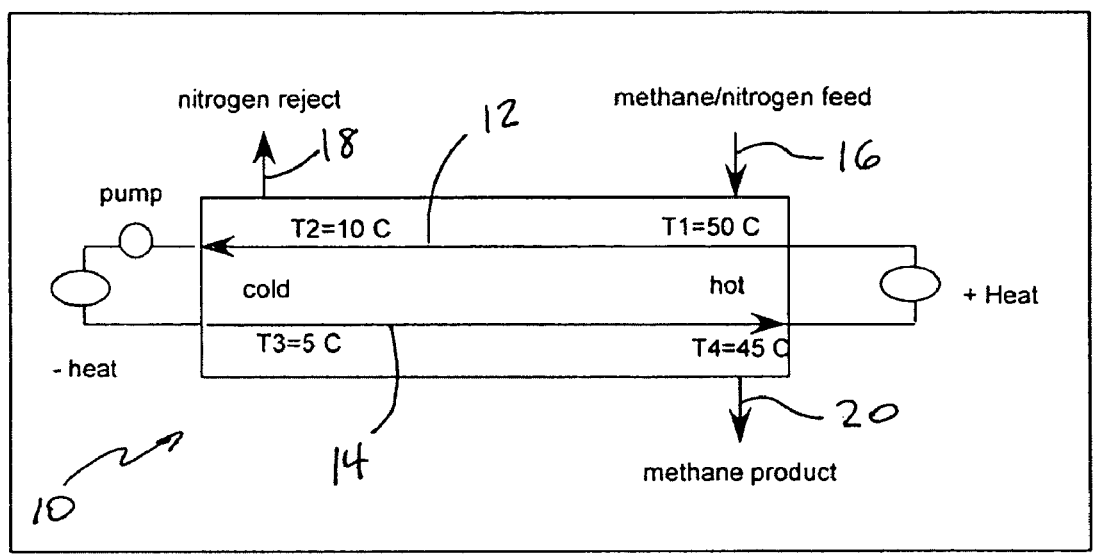
FIG. 1 is a diagram showing an exemplary process for the purification of methane from a mixture comprising methane and nitrogen.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

Exemplary embodiments of the present invention include a thermally efficient system that includes absorption, desorption, and recuperative heat exchange unit operations. In some embodiments, additional heat exchange unit operations may be added either internally or externally to an integrated microchannel apparatus. For example, two or three may be integrated into a single microchannel apparatus.

As shown in FIG. 1, in exemplary three unit operations of absorption, desorption, and recuperation integrated in a single microchannel apparatus 10, four critical temperatures are defined where T1 is the inlet temperature of the absorbent at the start of the absorption channel 12, T2 is the outlet temperature of the absorbent at the end of the absorption section 12 of the channel, T3 is the inlet temperature at the start of the desorption channel 14 and T4 is the outlet temperature of the desorption channel 14. T2 may be greater than T3 and/or T1 may be greater than T4. Heat may flow from the absorption unit operation to the desorption unit operation.

The applied temperature gradients while counterintuitive aid in the recuperation of energy between absorption and desorption. Close approach temperatures are desired between either the T1 and T4 streams at one end of the apparatus, the T2 and T3 streams at one end of the apparatus, or both the T1 and T4 streams and the T2 and T3 streams. The approach temperature between the T1 and T4 end of the apparatus may be less than 10 C, or less than 5 C, or less than 2 C, or less than 1 C, or in exemplary embodiments between 0.05 and 1 C. The approach temperature between the T2 and T3 end of the apparatus may be less than 10 C, or less than 5 C, or less than 2 C, or less than 1 C, or in exemplary embodiments between 0.05 and 1 C. A small amount of energy must be augmented or added to the absorption fluid as it flows from the desorption to the absorption channel. A small amount of energy must be removed from the absorbent as it flows from the absorption to the desorption channel. Further T4 must be greater than T2 for absorbents whose Henry's law constants increase with temperature.

In an alternate embodiment where the Henry's law constant decreases with temperature, then the reverse temperature profile may be desirable where T2 is greater than T4 and T3 is greater than T2 and/or T4 is greater than T1.

In other embodiments, the parasitic power loss for the absorption system may be less than 20% of the system produced power, and, in some embodiments, less than 10%.

Exemplary embodiments may include thin film separations. For example, mesh flow with counterflow of feeds such that the flow of the liquid absorbent is retained or constrained within a channel or structure by the use of capillary forces that minimize the mixing or back mixing of a liquid and a gas in a microchannel.

Exemplary embodiments may include mixed phase flow using surface features, for example a one pass process with co-flow feeds. The fluid mixture of liquid and gas are co-fed either inside or outside of the microchannel device and flow in a co-flow arrangement. The fluid is pushed and pulled in and out of the surface features.

Exemplary embodiments may include multiphase flow through a packed bed with co-flow of feeds. The gas and liquid flow in a co-flow arrangement and are mixed to create a high interfacial area by flowing past a series of obstructions in the form of posts, baffles, and/or a porous packed bed of rings, spheres, or other shapes.

Exemplary embodiments may include contactor based absorption and desorption unit operations where a thin contactor plate separates the phases to assist with countercurrent flow. The contactor plate has sufficiently small apertures such that capillary pressure of the liquid retains the liquid on one side of the contactor plate and the gaseous stream on the other side of the contactor plate.

Exemplary embodiments may include foam flow, where the methane-containing gas and liquid stream flow substantially through a foam, wad, mesh or other porous and connected media. The connected media may be assembled with the close coupling of several porous media, such as a stack of foams (which may be used instead of a discontinuous array of particles such as pellets or beads, for example). The flow of gas and liquid sorbent through the foam may be countercurrent or co-current. The liquid preferentially wets the foam or continuous and connected media to increase the surface area and absorbs one or more species during the absorption cycle and desorbs one or more species during the desorption cycle.

Exemplary systems including multiple unit operations may be configured to reduce the amount of additional energy or power required to drive the separation process. For example, an exemplary microchannel absorber uses an ionic liquid to absorb methane gas from a feed gas 16 comprising same. The feed gas 16 flows into the absorber 12 at a first temperature and pressure. The methane is preferentially absorbed into the ionic liquid or other absorbent, while the less strongly absorbed nitrogen, which has much less affinity to absorption by the ionic liquid or other absorbent, passes through and exits the absorber as a lean gaseous stream 18.

The methane may be desorbed in a second unit operation 14. Increasing the temperature reduces affinity for the absorbed methane and therefore desorbs the methane 20. In another exemplary embodiment with an ionic liquid or other absorbent whose Henry's constant decreases with increasing temperature, the methane may be preferentially desorbed by decreasing the temperature. For example, the Henry's constant for methane at 10 C may be 1480 bar while at 50 C it may be 1310 bar. With alternate ionic liquids, the absorption-desorption behavior could be driven either by a hot-cold or a cold-hot cycle. In another exemplary embodiment, the temperature may be either increased or decreased to assist with the desorption of the solute and/or the pressure may be decreased to also assist with the desorption of the solute.

Other exemplary embodiments include single unit operation with a cold and a hot end that recuperate energy between absorption and desorption to improve the energy recovery and system efficiency. Also, two unit operations (one cold and one hot), where energy is recuperated between the unit operations to reduce the parasitic power requirement. In another exemplary embodiment, a distillation type configuration includes an interior feed point and a concentrated methane stream removed at the top of the channel and a concentrated nitrogen stream removed at the bottom of the column. Heat may be added or removed at the top and or bottom or interior points of the channel Nitrogen is reported to have little or no affinity in the BmimPF6 ionic liquid as well as potentially other ionic liquids. In an exemplary embodiment, nitrogen is removed at the end of the absorption channel, while methane and carbon dioxide are absorbed into the liquid. The liquid is pumped to a desorption stage, where both the methane and carbon dioxide gases are removed. In this embodiment, single stage absorption unit operation is required.

If nitrogen is partially absorbed in a selected ionic liquid, then multiple stages may be useful and a counter flow of the liquid and gas may be advantageous.

Exemplary systems may be adapted to minimize power consumption for the purification of methane in a fluid comprising methane and nitrogen. For example, FIG. 1 depicts a thermally integrated system 10 for recuperating energy to an absorption-desorption cycle using ionic liquids. As shown, the approach temperatures are 5 C at each end of the unit and a larger 40 C driving force is applied to assist with increasing the capacity difference for methane.

The Henry's law constant for methane at 10 C of 1480 bar is used along with the minimum Henry's law constant for nitrogen of 20,000 bar. Using an exemplary inlet system pressure of 10 bar and a feed gas mixture comprising 80% methane, the liquid mole fraction of methane is 0.016.

For an exemplary system with a total feed flow rate of 2,000,000 standard cubic feed per day and the 80% feed methane composition, then the required flow rate of the ionic liquid discussed is roughly 54,000 L/min at equilibrium to recover roughly 63% of the methane. The reported molecular weight of this ionic liquid is 284 gm/mole. The reported density is roughly 1.37 gm/cc. The volumetric ratio of liquid to gas is roughly 1.4 at the feed inlet. The ratio increases to roughly 7 as the bulk of the methane is absorbed into the ionic liquid. For alternative ionic liquids with more capacity for methane over that reported in this example, then the amount of ionic liquid required would reduce roughly proportionally with the reduction in Henry's law constant.

From the reported maximum Henry's, law constant for nitrogen, the minimum purity possible in an exemplary single stage is 98.2%. If the actual Henry's law constant is lower than the maximum reported value, then the purity for methane in a single stage may be higher than 98.2%

Purity=(ymethane/Hmethane)/(ymethane/Hmethane+ yN2/HN2) where y is the feed mole fraction and H is the Henry's law constant. Purity is defined exclusive of the absorbent.

For an exemplary thermal swing process, energy must be added to the gas-fluid mixture to desorb the methane and removed from the fluid to absorb the methane. Using an average heat capacity as reported in the literature of 400 J/mol-K and the reported liquid flow rates, then the amount of energy added will be a function of the degree of thermal recuperation.

Table 1 shows energy required as a function of approach temperature to capture 63% of a mixture comprising 80% nitrogen and flowing at 2 million standard cubic feet per day using the BmimPF6 ionic liquid.

TABLE 1

| dT in C (approach at each end) | Q-heat (MW) | Q-cool (MW) | Q total (MW) |
|---|---|---|---|
| 10 | 17.3 | 17.3 | 34.6 |
| 5 | 8.7 | 8.7 | 17.4 |
| 2 | 3.7 | 3.7 | 7.4 |
| 1 | 1.7 | 1.7 | 3.4 |
| 0.5 | 0.87 | 0.87 | 1.74 |
| 0.1 | 0.17 | 0.17 | 0.35 |

As shown in Table 1, as the approach temperature is improved at each end of the unit, the total amount of energy required to drive the system is reduced. An exemplary process may be operated with approach temperatures less than 10 C to remove the heat, or add the heat to the ionic liquid, or both. Another exemplary process may have approach temperatures less than 5 C. Yet another exemplary process may have approach temperatures below 2 C and in some embodiments less than 0.5 C. In an exemplary embodiment, the approach temperature at one or both ends may range from 0.05 C to 0.5 C.

The absorption process requires heat for methane in the bmimPF6 ionic liquid as cited, roughly 2 kJ/mol of methane for the cited ionic liquid. For this separation and the moles of methane absorbed, roughly 47 kW of energy will be required during absorption. Using the heat capacity of the ionic liquid, this roughly equates to less than a 0.03 C temperature loss in the fluid, but this is advantageous as the bulk temperature of this fluid stream is decreasing in the absorption section of the process system. This small increase will result in a slight increase in the log mean temperature difference for the heat exchanger and result in a slightly smaller requirement for surface area which is typically advantageous.

For the example above, the calculated methane recovery is roughly 63%. If higher methane recovery is sought, then more ionic liquid is required in a one-stage process.

Table 2 shows the relationship between methane recovery and flow rate of BmimPF6 ionic liquid absorbent.

TABLE 2

| Methane recovery % | IL flow rate (L/min) |
|---|---|
| 63 | 54550 |
| 70 | 68350 |
| 80 | 95530 |
| 90 | 138300 |
| 95 | 170300 |

Table 3 shows the relationship between methane recovery and flow rate of alternative ionic liquid absorbent with ten times lower Henry's law constant for methane absorption than BmimPF6, or namely an H equal to 148 bar.

TABLE 3

| Methane recovery % | IL flow rate (L/min) |
|---|---|
| 63 | 5290 |
| 70 | 6650 |

TABLE 3-continued

| Methane recovery % | IL flow rate (L/min) |
|---|---|
| 80 | 9340 |
| 90 | 13590 |
| 95 | 16780 |

For this case with a Henry's law constant for methane of 148 bar versus 1480 bar and a target methane recovery of 90%, then roughly 13,600 L/min of an ionic liquid would be required for the 2,000,000 standard cubic feet per day application in this example to recover 90% of the methane with a purity exceeding 98% from a feed mixture of 80% methane. For this case with recuperation of 0.5 C at each end of the heat exchanger, then less than a 0.5 MW of thermal energy would be required for the methane separation to a purity exceeding 98% from a feed of 80%. For this system the thermal energy content of the purified methane is roughly 17 MW which does not account for losses of conversion from thermal energy to work. Using a typical conversion efficiency of a gas fired power plant of roughly 65%, then the total net work generated from this capacity system is roughly 11 MW. The total parasitic power requirement to drive this system is less than 10% of the total, and for this example less than 5% of the work generated from the purified methane. For the extreme case where a 0.1 C approach temperature is maintained for the heat exchanger, then with the improved absorbent, likely an ionic liquid, then the total parasitic thermal power required is roughly 0.1 MW which represents on the order of a 1% parasitic power loss. Further it is possible to consider the recovery of a higher fraction of methane beyond 90%. In one embodiment, 92%, or 95%, or 97%, or 99% of the methane is captured from the system. As the absorption capacity increases, the ease of efficiently capturing more of the methane in a one-pass system improves.

Figure 2:
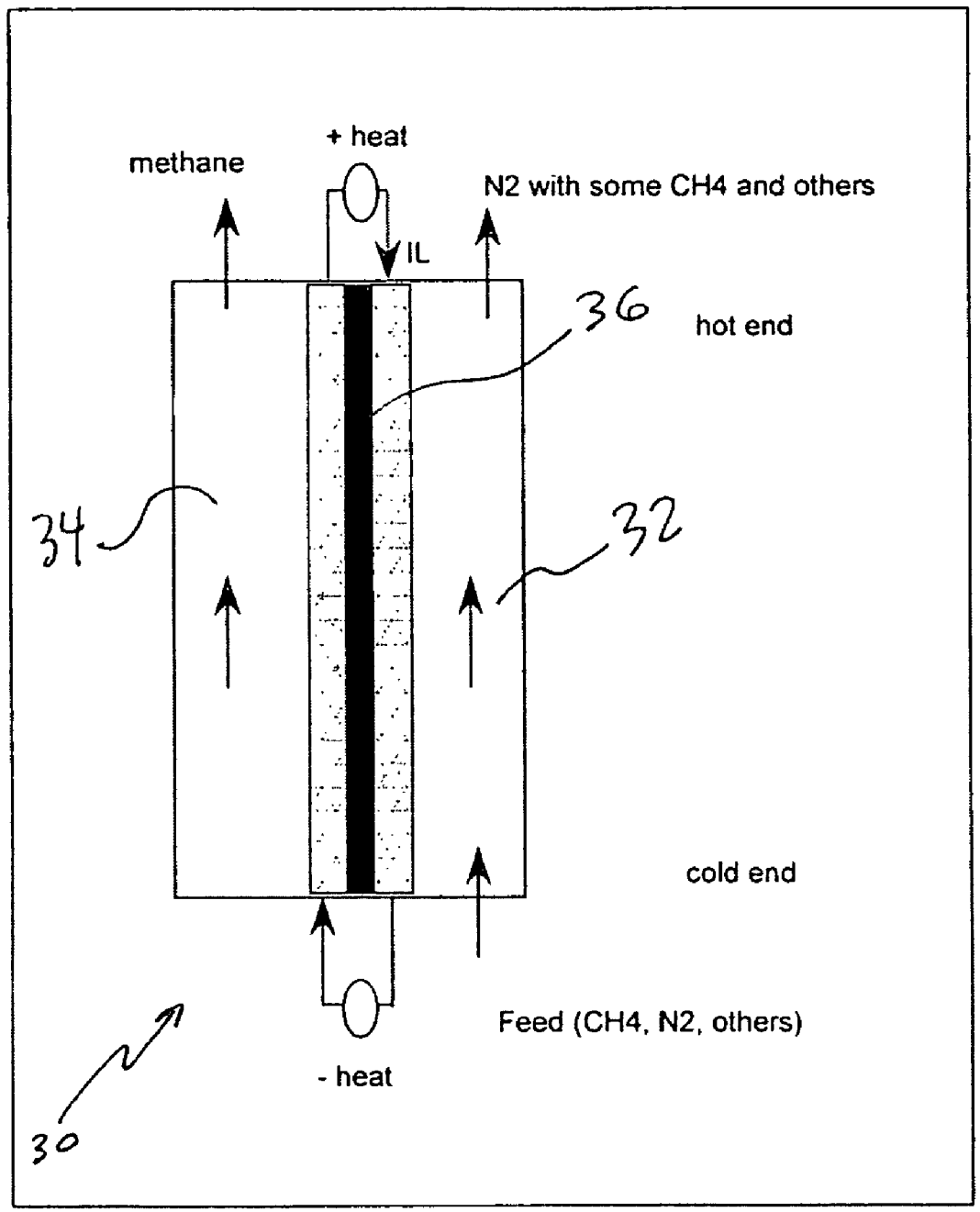
FIG. 2 is a diagram showing an exemplary integrated absorption/desorption system in a single block to recuperate heat from the two half cycles to reduce the overall parasitic power loss.
Figure 3:
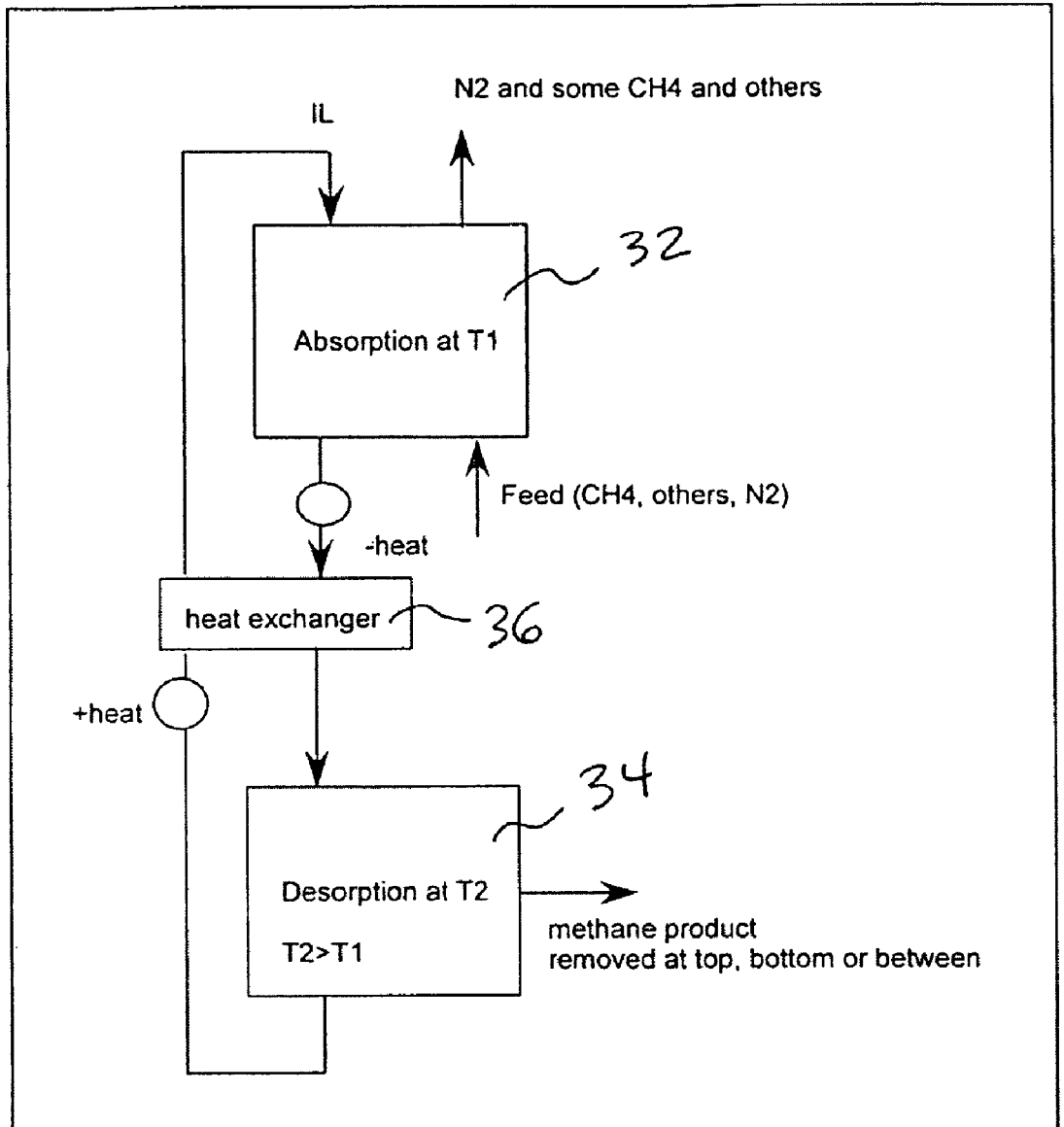
FIG. 3 is an alternate exemplary system for efficiently transferring energy between absorption and desorption cycle to reduce parasitic power use.

In another exemplary embodiment, a multi-stage absorption system employing counterflow of an ionic liquid and the feed gas enables the use of a reduced volume of the ionic liquid absorbent. The heat is recuperated between hot and cold devices or ends of a device as shown in FIG. 2. The recuperation of heat, using a heat exchanger 36, for example, reduces the amount of parasitic energy loss for an advantaged system. The further advantage of the counterflow absorption system is the enablement of multiple stages for separation which reduces the required inventory of the ionic liquid. This approach typically requires contacting the two phases in a counterflow mode. The absorber 32 and desorber 34 units could be separate unit operations as shown in FIG. 3 or integrated in a single unit operation or block as shown in FIG. 2.

Figure 4:
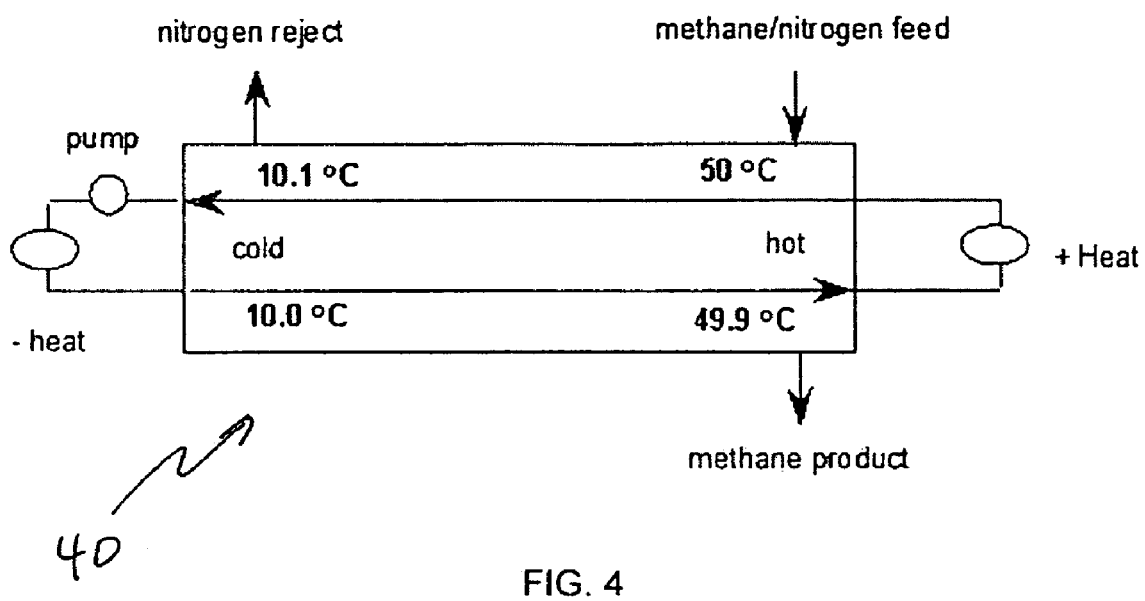
FIG. 4 is a diagram showing an exemplary heat recuperation concept in a absorption/desorption process of methane into ionic liquid for separation.

In another exemplary embodiment shown in FIG. 4, a microchannel heat exchanger 40 is used to recuperate ionic liquid sorbent. It is typically advantageous to reduce the parasitic energy loss in the absorption/desorption process of, for example, methane into ionic liquid for separation, in order to make the system operation economical. This means to reduce the energy input "−heat" or "+heat" in the system, which is equivalent to having a heat recuperation with very tight temperature approach at the hot and cold end. Thus, a superior heat exchanger is desired.

Figure 5:
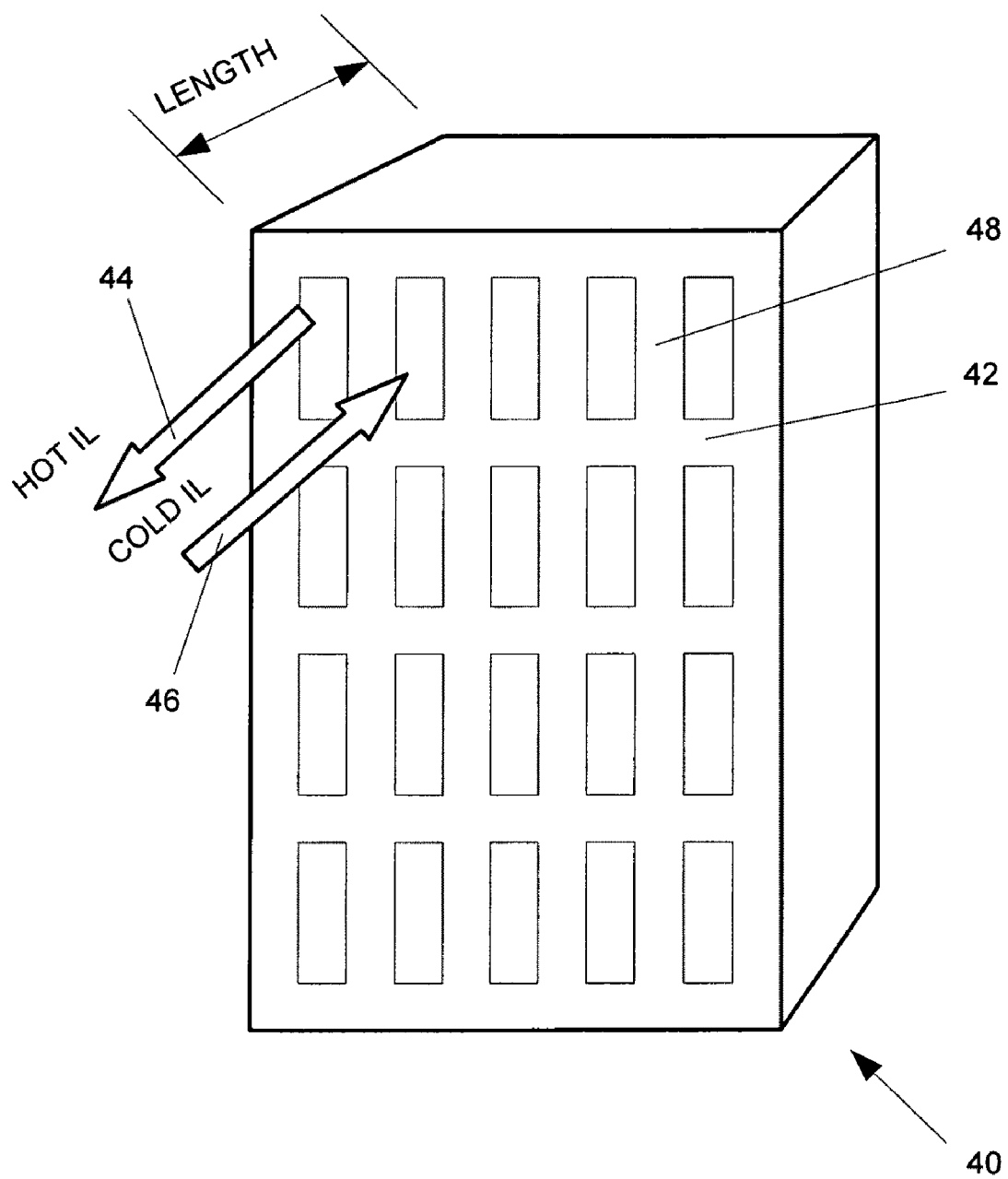
FIG. 5 is a diagram showing an exemplary configuration of microchannels in a heat exchanger core.
Figure 6:
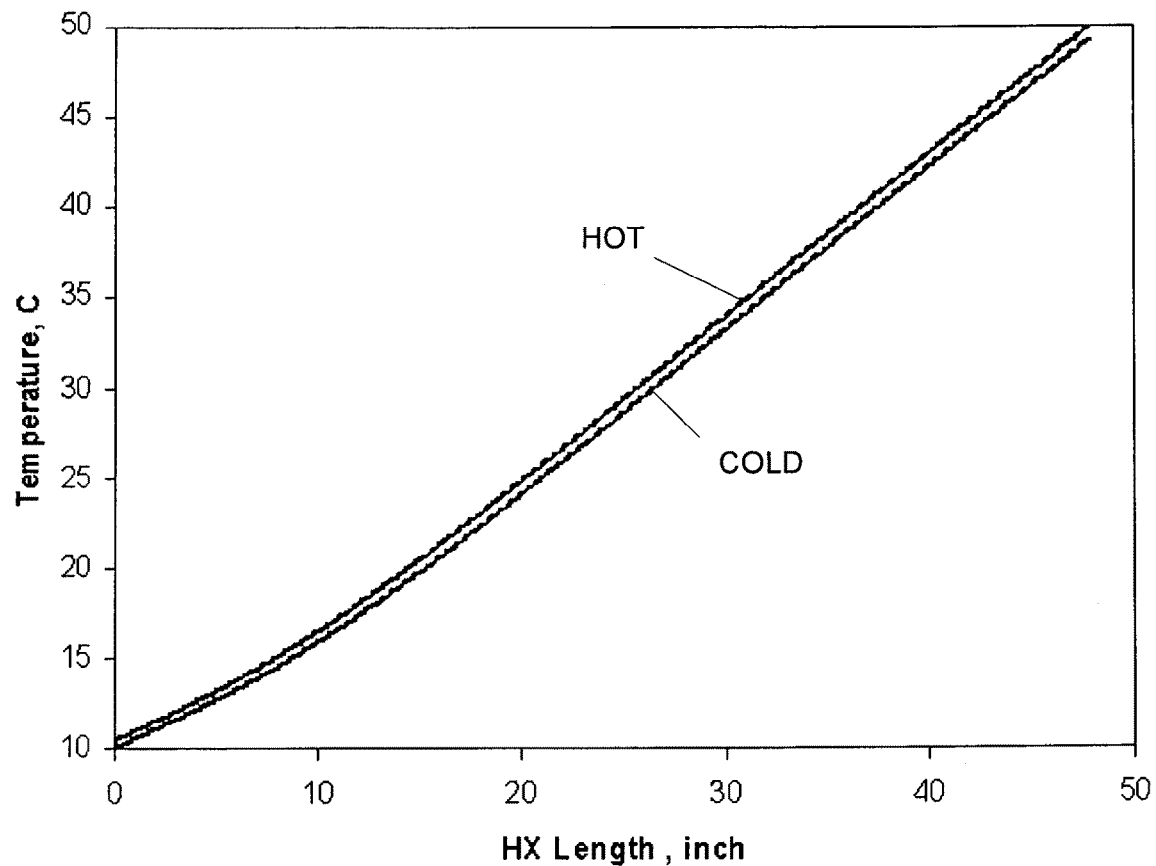
FIG. 6 is a plot of temperature versus length for a calculated temperature profile of an exemplary microchannel heat exchanger.

In the exemplary embodiment, a microchannel heat exchanger/recuperator 40 is utilized. An exemplary microchannel heat exchanger is disclosed here in a design example of the following performance conditions:

Liquid flow rate: 54,000 L/min; closed loop system
CP=1407 J/mol-K
density=1.37 gm/cc
viscosity=30 cP
$T_{max}$=50 C
$T_{low}$=10 C
Thermal conductivity=0.19 W/m-K
Approach temperature target 0.1 to 0.25 K on each end.
Liquid volume 1000-10000 liters
Material: stainless steel As shown in FIG. 5, the exemplary embodiment employs a counter-current flow arrangement. The exemplary microchannel wall 48 that separates the hot liquid 44 and cold liquid 46 is 0.01" thick, while the channel gap 42 size is also 0.01". For the above given flow rate at each side, a total length of 48" achieves a 0.25 K approach temperature at the two ends for a goal of a temperature differential near 40 C between the hot and cold ends of the absorption and desorption system. For a system requiring a smaller temperature difference to achieve a desired system capacity for the absorbed solute, for example a 20 C or 10 C or more or less difference between maximum and minimum temperature, then the process may have a shorter heat exchanger length less than 48" to achieve a very small (<1 C) approach temperature. FIG. 6 shows a calculated temperature profile of an exemplary microchannel heat exchanger.

Table 4 provides exemplary parameters of the ionic liquid heat exchanger with 0.25 K approach temperature.

TABLE 4

| # of channel | 5000000 | |
|---|---|---|
| Density | 1370 | kg/m3 |
| Total Flow Rate | 50000 | L/min |
| | 4110000 | kg/h |
| Flow rate/channel | 0.01 | L/min |
| | 822 | g/h |
| Dh | 0.038095238 | in |
| | 0.000967619 | |
| A | 1.29032E−06 | m3 |
| Re | 5.707619881 | |
| Channel volume | 7.86579E−07 | m3 |
| Total liquid volume | 3.933 | m3 |
| Metal volume/channel (No perimeter) | 9.439E−07 | m3 |
| | 4.72 | m3 |
| Heat transferred/channel | 12.57665 | Watts |
| Total | 62883250 | Watts |

The building material of the heat exchanger can be any chemically compatible metal or non-metal, as long as its thermal conductivity is in the range 1-500 W/m K, for example. The change in the approach temperature may be less than 1 degree Celsius. The liquid conductivity has a great effect. For a diluted ionic liquid, for example [bmim][PF6], at a conductivity 0.38 W/m K, the heat exchanger length can be shortened to less than 30" for the same approach temperature. Thus, for an optimization combining thermal and chemical processes, a diluted ionic liquid with higher thermal conductivity components is an option.

In another exemplary embodiment, a microchannel apparatus using co-current contacting of methane-rich vapor and liquid absorbent streams in a micro-channel allows very fast and efficient mass transfer between the two streams prior to phase separation. An experimental test stand was designed for versatility to allow handling and processing of a wide range of liquid absorbents and gaseous stream compositions, flow rates, and temperatures. The processes include the use of the 1-butyl-3-methylimidazolium hexafluorophosphate, [bmim]

[PF6], ionic liquid absorbent and a gaseous stream of 70% nitrogen, 15% carbon monoxide, and 15% methane, for example.

Figure 7:
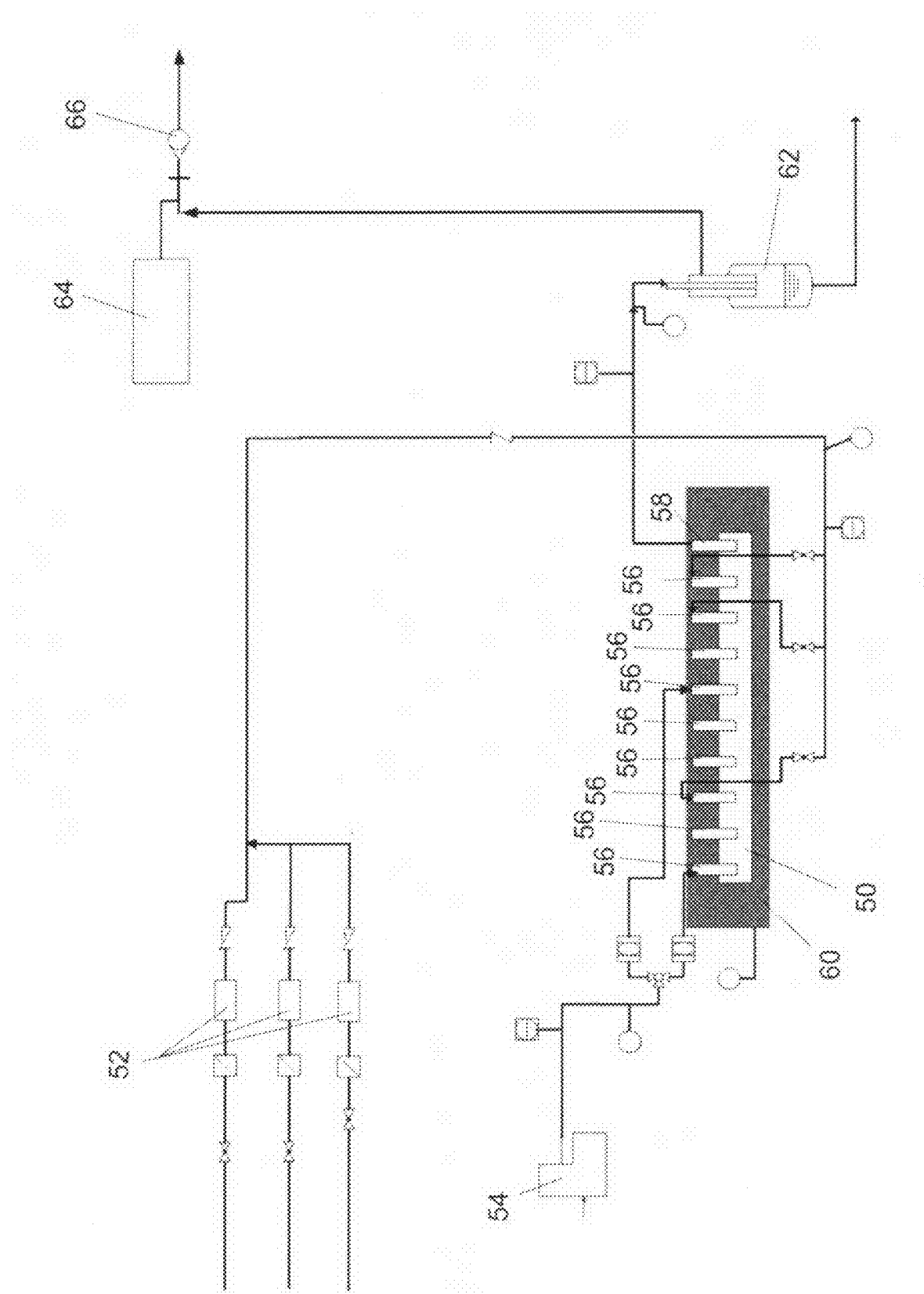
FIG. 7 is piping and instrumentation diagram of an exemplary microchannel test stand.
Figure 8:
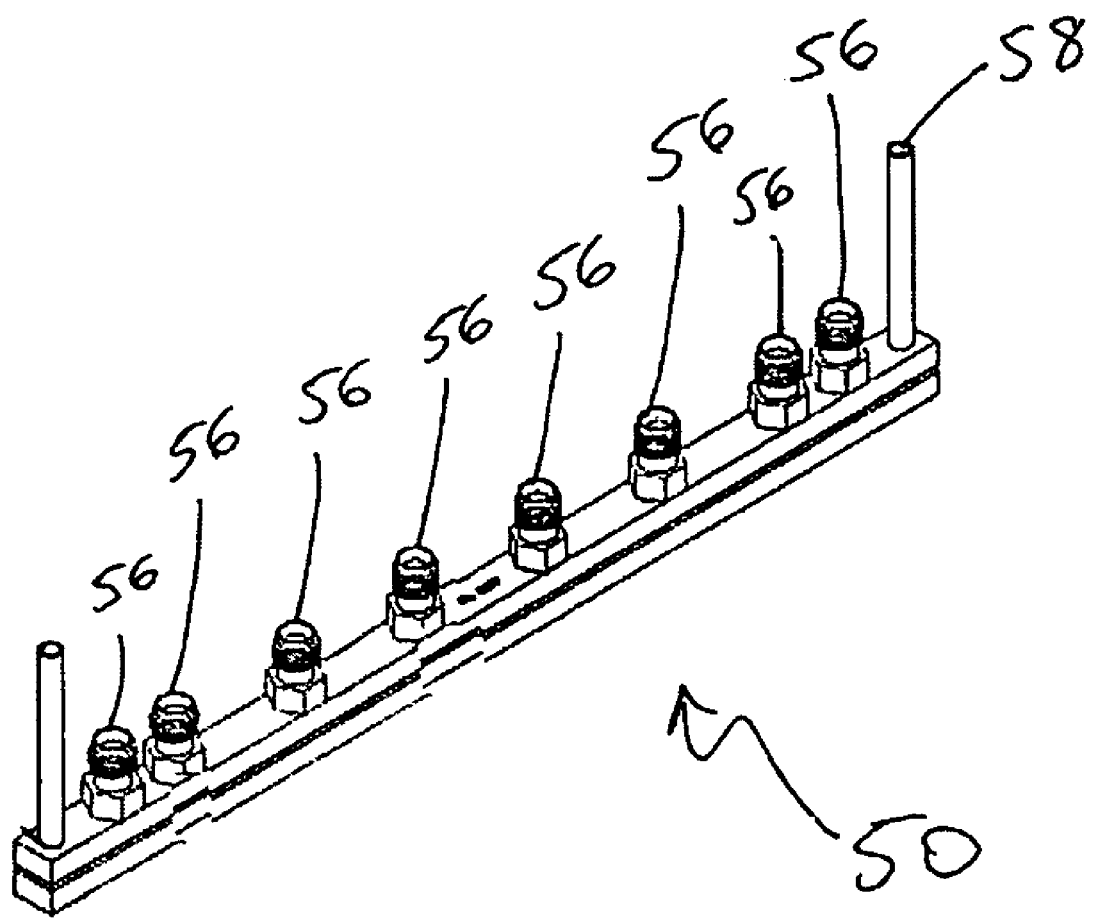
FIG. 8 is an isometric view of an exemplary microchannel device.
Figure 9:
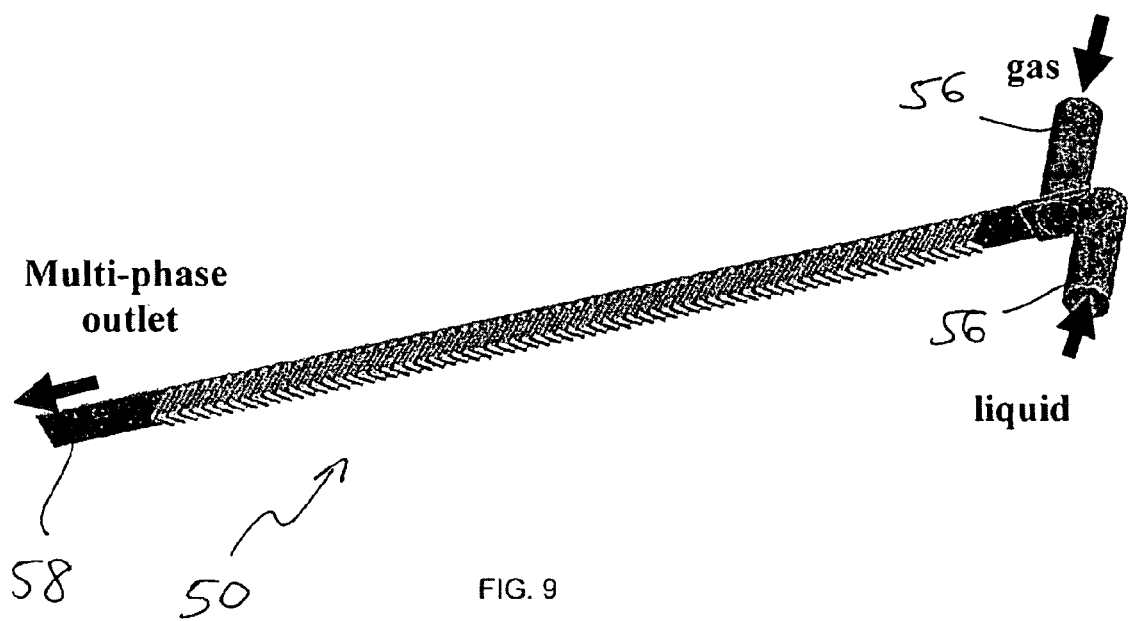
FIG. 9 is diagram showing exemplary embedded mixing features in a microchannel device.

As is shown in FIG. 7, the exemplary assembly centers about a horizontally mounted, 12" long, micro-channel device, shown in FIGS. 8 and 9. The device configuration can be modified to incorporate flat or mixing features embedded in the walls. Computational fluid dynamics (CFD) results (shown in FIGS. 10-12) show enhanced phase mixing resulting from the use of embedded floor mixing features within the microchannel. The improved mixing is expected to increase the interfacial area and the ease of achieving the target solubility of the methane in the ionic liquid.

In the exemplary embodiment, vapor feed flows are regulated by Brooks Thermal mass flow controllers 52. The liquid is fed by an ISCO high pressure syringe pump 54. Feed streams can enter the device through a number of ports 56, strategically located along its axis. All streams exit the device through the same exit port 58. Testing can be performed with single phases or multiphase mixtures. Thermocouples and pressure transducers, inserted along the device length, allow measurement of temperatures and pressure drops. The device is immersed in a controlled temperature bath 60. System pressure is controlled by throttling needle valves appropriately located in the vapor exit path. Immediately downstream of the device, the phases are separated by passing through a gas/liquid separating drum 62. The liquid is collected in a dedicated pressure vessel. The vapor stream composition is analyzed via an Agilent 3000 Micro gas chromatograph 64, Model G2891A, to allow instantaneous measurement of vapor exit stream compositions. The vapor stream flows through a bubble meter 66, for measurement of vapor exit flow rate. Metal system components are 316 stainless steel, and all soft components are compatible with the corrosive ionic liquids.

In the exemplary embodiment, liquid and vapor streams enter the device through ports 56 along the device axis, flow co-currently, and exit the device through a single outlet port 58. The device includes a mixing plate with embedded features in the channel floor to mix the gas and liquid stream and increase the interfacial area for good contacting and mass transfer. The floor of the microchannel contains an array of parallel mixing features that act to push and pull the fluid and create small bubbles with high interfacial area.

Figure 10:
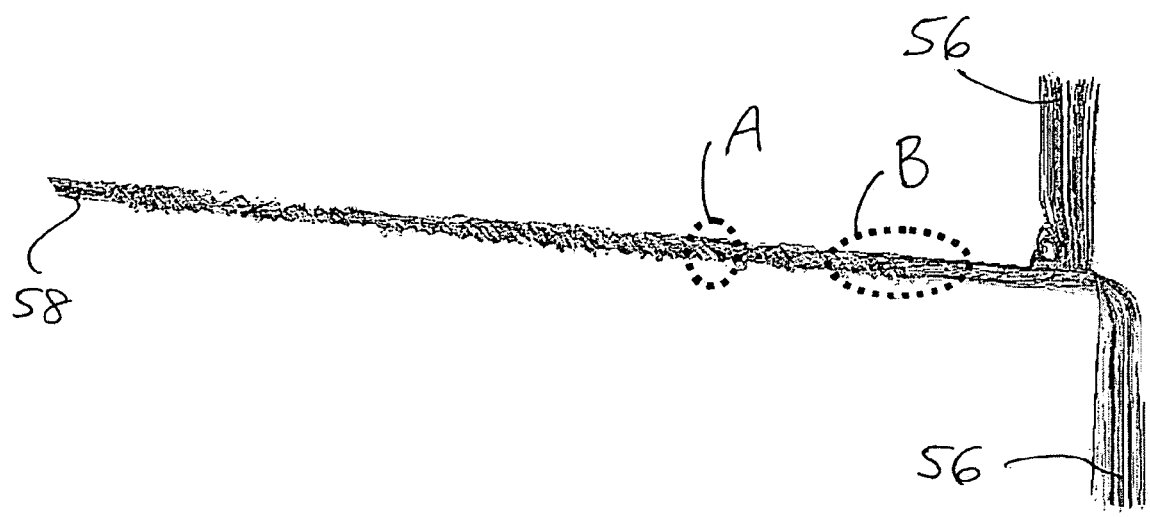
FIG. 10 is that graphical result of a computational fluid dynamics simulation of the flow patterns (as shown by fluid path lines that trace the movement) during the mixing of a gas and liquid in the microchannel device of FIG. 9.
Figure 11:
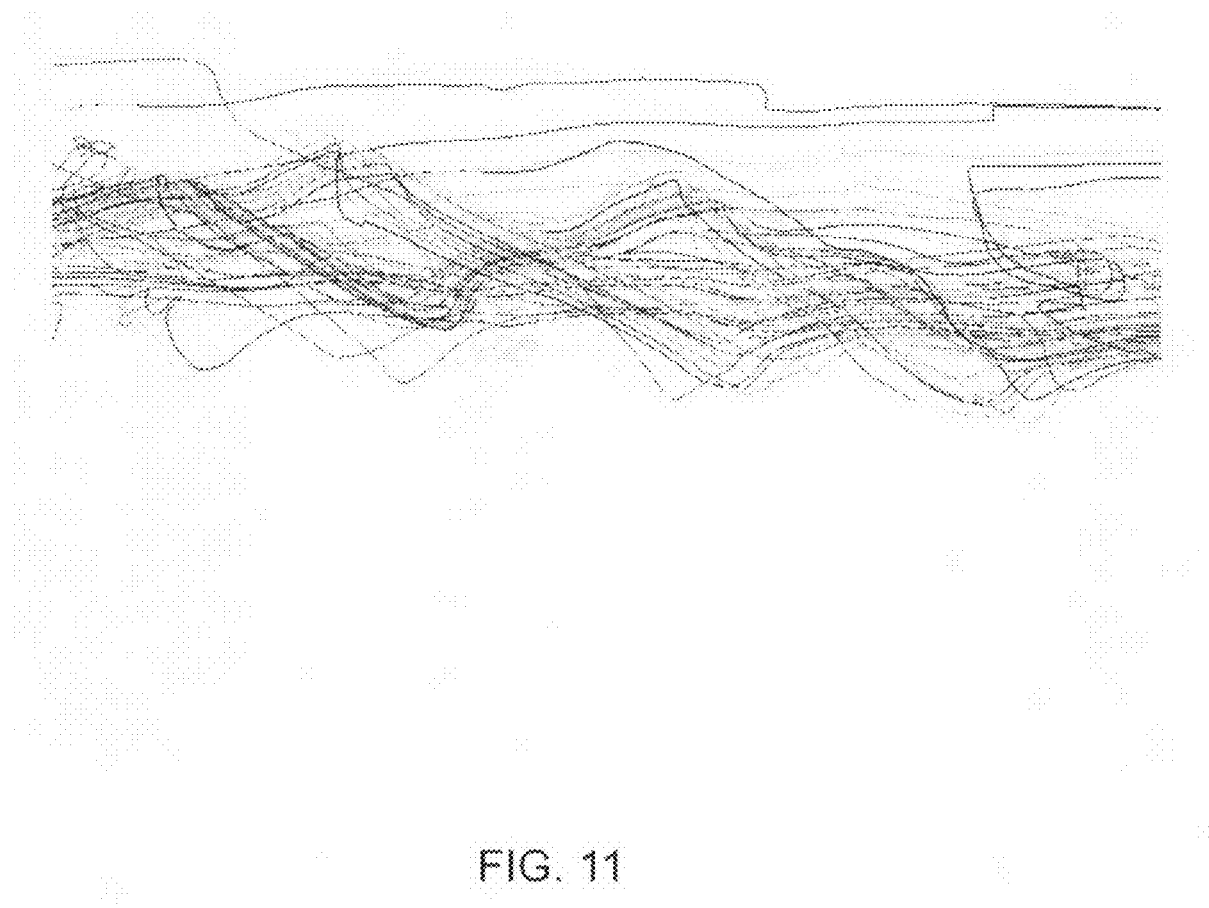
FIG. 11 is detailed view of detail A of the result of the computational dynamics simulation of FIG. 10.
Figure 12:
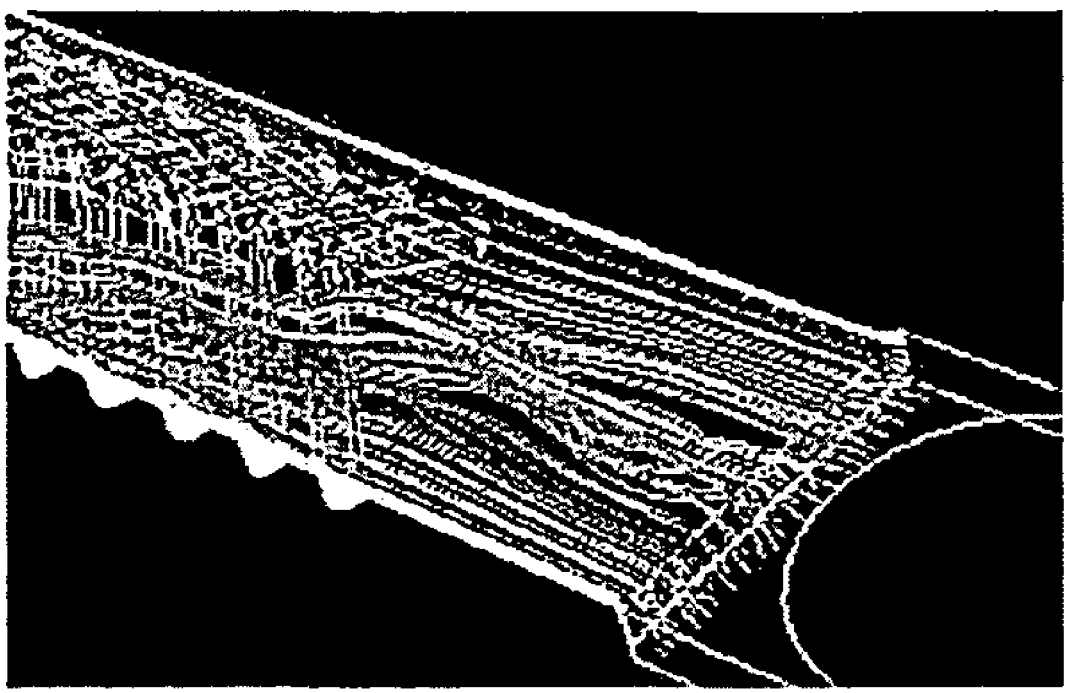
FIG. 12 is detailed view of detail B of the result of the computational dynamics simulation of FIG. 10.

Referring to FIGS. 10-12, the otherwise straight laminar flow patterns are broken, suggesting enhanced phase mixing.

All system pressures and temperatures may be recorded, at a variable 5 to 30 second intervals, for example, depending on the needs of the particular experiment. A LabView 7.1 data acquisition program specifically prepared for the microchannel test stand will be used. Real time profiles will also be monitored during the run to help determine system equilibration.

In general, operations of the exemplary system may include step such as:

1. Calibrate the GC, adopting standard calibration gases spanning the concentrations of interest.
2. Synchronize the time of the GC and LabView computers.
3. Open the gas feed line(s) of interest.
4. Select the gas feed port, decide on the intended vapor feed flow rates and set the mass flow controllers accordingly.
5. Let the gas mixture pass through the device and measure the compositions of the feed stream, reporting all absolute measurements and ratios relative to the tracer feed, carbon monoxide. Assume the system has stabilized when three consecutive sample measurements are replicated.
6. When the system has settled, measure and report three consecutive bubble flow meter readings.
7. Decide the intended system operating/exit pressure and throttle the exit needle valves accordingly.
8. Set the liquid feed port and start feeding liquid to the system, modifying the exit needle valve opening to maintain the intended operating/exit pressure.
9. Measure the exit vapor stream compositions as a function of time. Measure the corresponding total exit vapor flow rate, as necessary.
10. Assume the absorption system has reached steady state when the exit feed compositions have stabilized.

The extent of absorption may be determined by ratioing the exit vapor stream compositions to the tracer value. Literature values of Henry's constant for the species of interest (Anthony, Maginn, and Brennecke, "Solubilities and Thermodynamic Properties of Gases in the Ionic Liquid 1-n-Butyl-3-methylimidazolium Hexafluorophosphate," J. Phys. Chem. B., vol. 106 (29), 2002) may be used to determine the maximum potential methane absorption for the given run conditions. The actual and maximum absorption values may be ratioed to gauge the performance of the multiphase absorption system.

Figure 13:
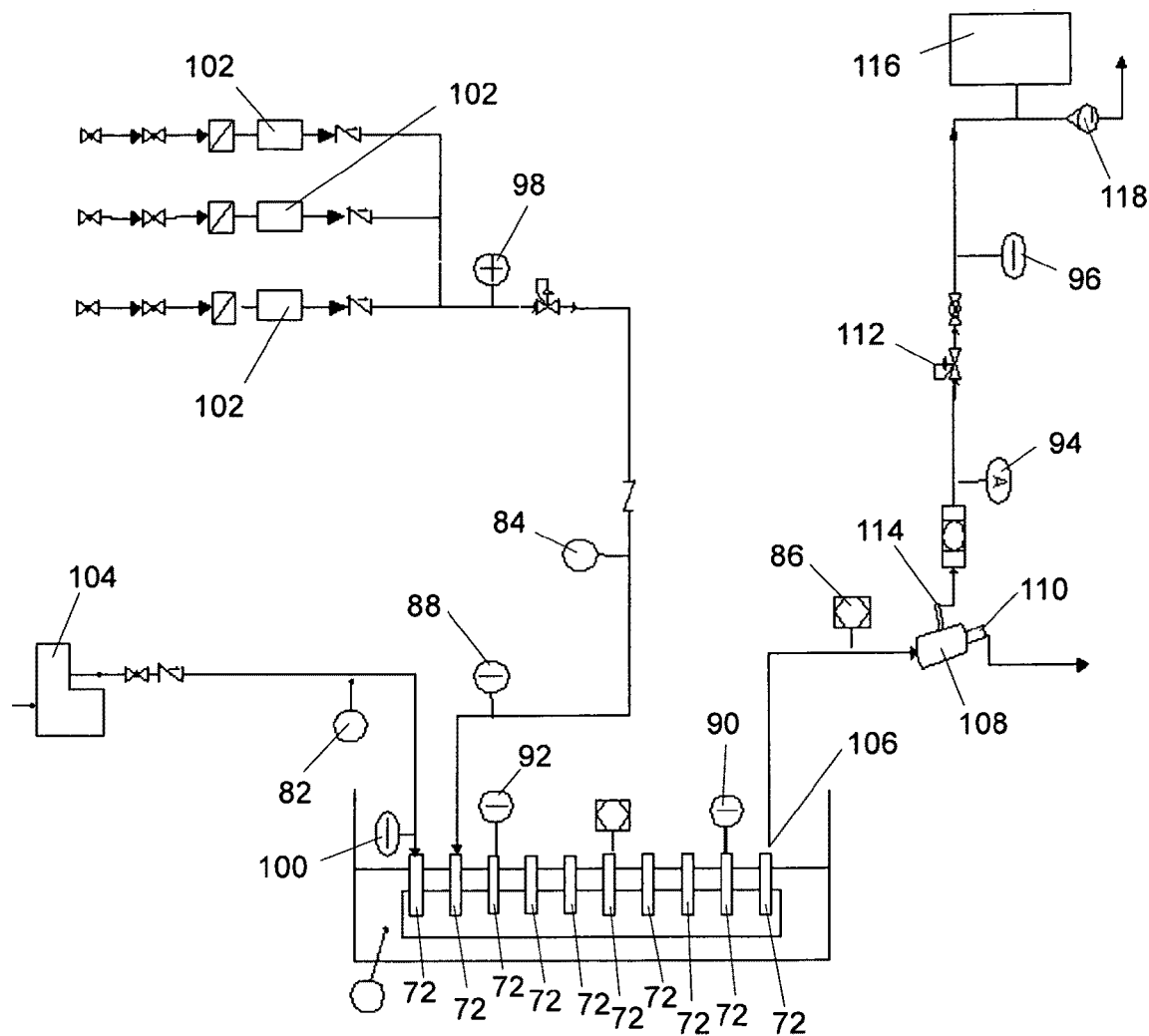
FIG. 13 is a piping and instrumentation of an exemplary microchannel test stand.

Another exemplary embodiment is shown in FIG. 13. The continuous flow configuration allows co-current contacting of mixed vapor and liquid streams in a microchannel 70. The high interfacial area and the short diffusion distances that are inherent to microchannel processing lead to very fast and efficient mass transfer between streams.

The exemplary experimental test stand was designed for versatility, allowing handling and processing of a wide range of liquid absorbents and gaseous stream compositions, flow rates, and temperatures. Ports 72, distributed along the length of the 12 in-long microchannel 70, allow fast changes in feed location, potential staggering of feed streams and feed compositions, and pressure transducer placement to fit specific run needs. Metal system components are 316 stainless steel; all soft components are compatible with the ionic liquids.

Figure 14:
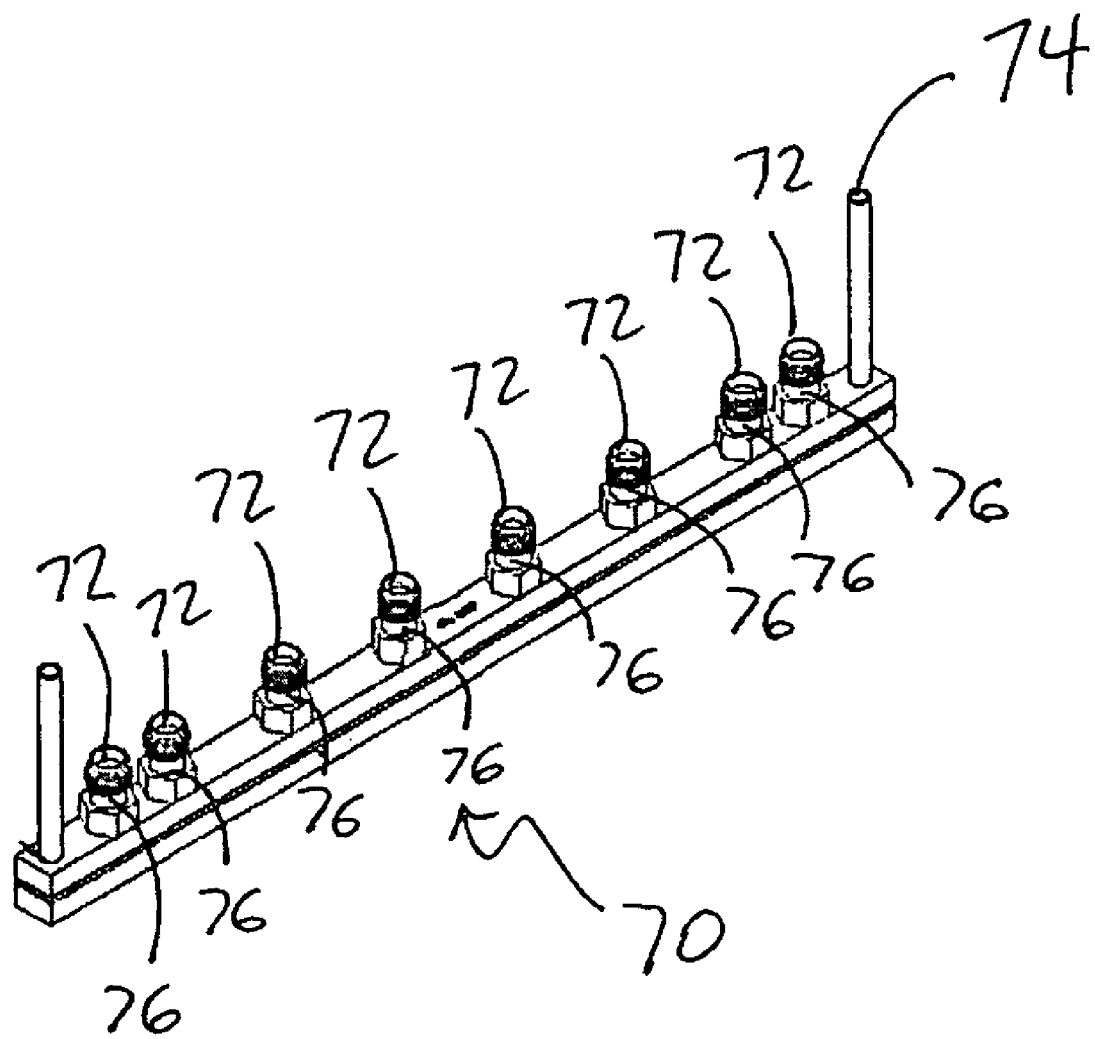
FIG. 14 is an isometric view of an exemplary microchannel device.
Figure 15:
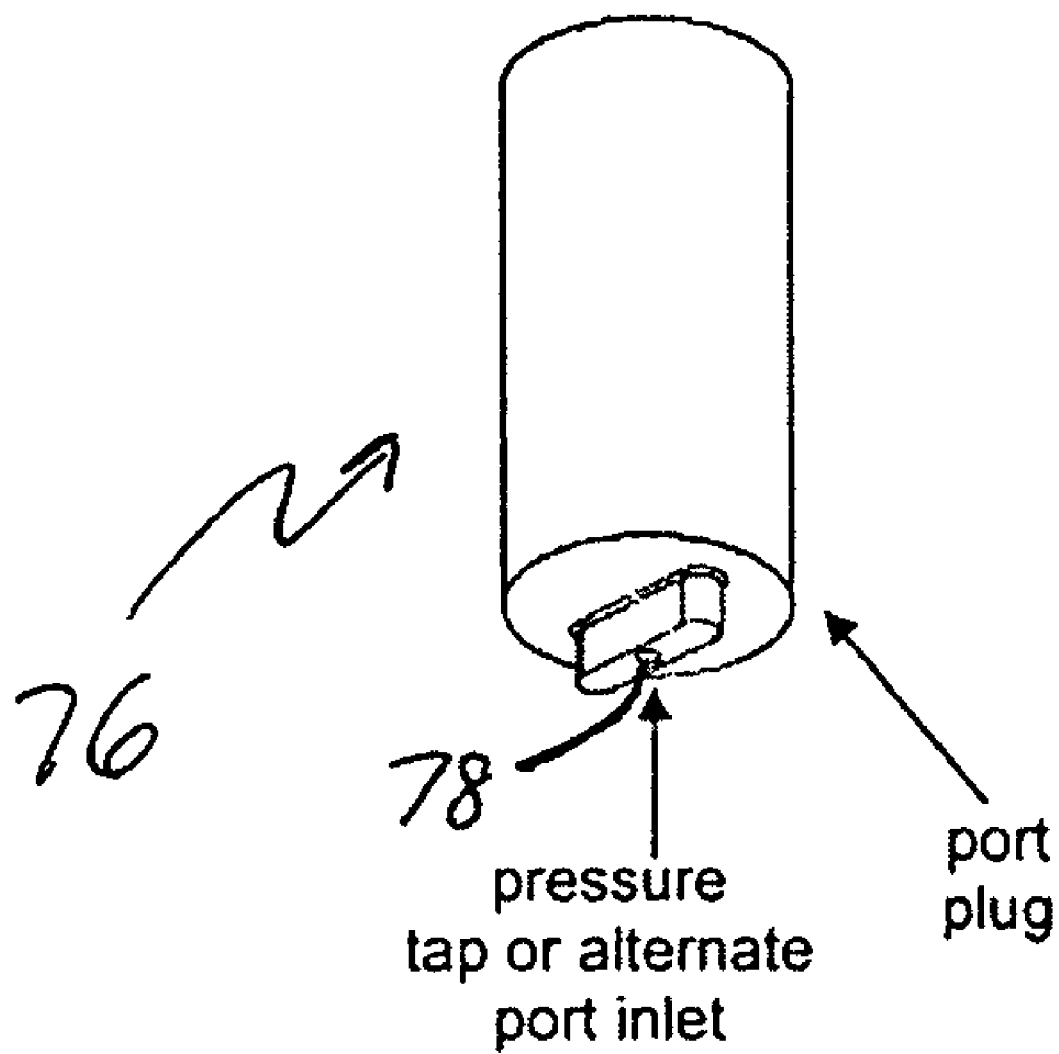
FIG. 15 is a detailed view of an exemplary port plug of the exemplary microchannel device of FIG. 14.
Figure 16:
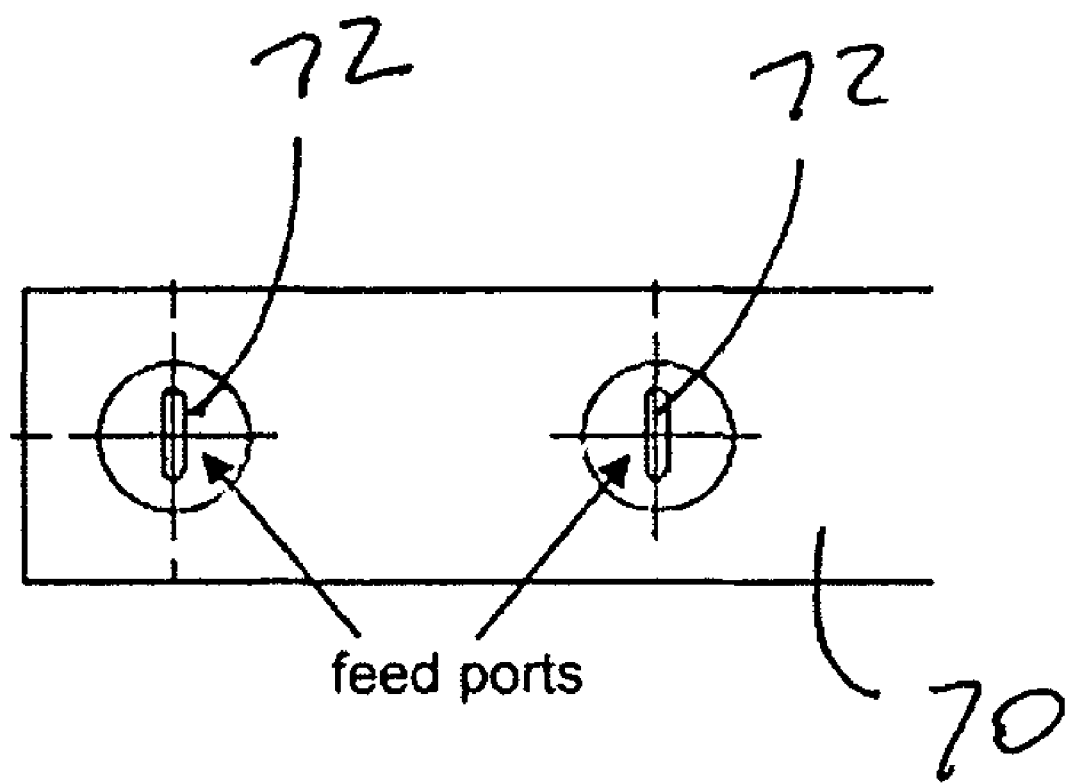
FIG. 16 is a detailed overhead view of the exemplary microchannel device of FIG. 14 with the port plugs removed.

Detailed aspects of the exemplary device 70 are shown in FIGS. 14-16. Liquid and vapor streams enter the device through ports 72 along the device axis, flow co-currently, and exit the device through a single outlet port 74. The internal channel may be flat or incorporate surface features to promote mixing and interaction of the gas and liquid streams.

The feed ports 72 are 0.040 in-wide and span the width of the main channel, rendering the feed and stream merging uniform. The specifically designed plugs 76 fit flush with the internal main channel surface and minimize disruption in the main flow path. A 0.010 in diameter hole 78 in the center of each plug 76 allows pressure measurement or serves as an alternate means of introducing the feed. The device can be assembled as a flat channel or to incorporate mixing features embedded in the walls.

As is shown in FIG. 13, the exemplary microchannel 70 device is mounted horizontally in a temperature regulated water bath 80. The device is capable of withstanding up to 1800 psig at 150° C. Omega thermocouples 82, 84, 86, placed in the inlet and outlet flow paths, allow measurement of temperature changes during operation. Pressure transducers 86, 88, 90, 92, 94, 96, 98, 100 are used to measure process pressures and pressure drops. Temperatures and pressures are constantly monitored and the values collected using the Labview software allow complete mapping of operational profiles.

Vapor feed flows are regulated by Brooks Thermal mass flow controllers 102. The liquid is fed by an ISCO high pressure syringe pump 104. Testing can be performed with single phases or multiphase mixtures. In the exemplary device, all streams exit through the same exit port 106. During multiphase operation, the liquid and vapor are separated in a knock-out drum 108 immediately downstream of the exit port 106. Whether operated as a single or multi-phase system, vapor and liquid are always let flow out of the knockout drum 108. Liquid is always removed through the lower line 110 in the knock-out pot and let flow into a collection vessel. A needle valve controls the removal of gas from the headspace of the collection vessel 108 to the atmosphere. In a multiphase run, vapor is removed through the upper port 114 in the knock-out pot 108. The headspace in the liquid collection vessel is connected to the vapor exit line 114 to ensure pressure equilibration and free flow and removal of liquid from the knock-out pot 108 into the collection vessel. A back pressure regulator 112, downstream of the vapor headspace connection line 114, controls system pressure.

The back pressure regulator 112 reduces the pressure of the vapor stream from the knock-out pot 108 as it flows towards the gas chromatograph (GC) 116, prior to being exhausted to the atmosphere. Careful throttling of the needle valve on the collection vessel may be required to ensure that the headspace from the collection vessel flows directly to exhaust without being forced back towards the GC line; this is critical to ensuring accurate measurement of the instantaneous composition of the gas stream exiting the microchannel device 70. Flow meters 118 in the headspace removal line of the collection vessel and at the GC exit port help control the needle valve setting. As long as the vapor flow rate from the collection vessel exceeds the flow rate that results from vapor displacement by the liquid entering the collection vessel, the GC measurement is ensured to reflect the vapor composition in the knock-out pot 108.

Figure 17:
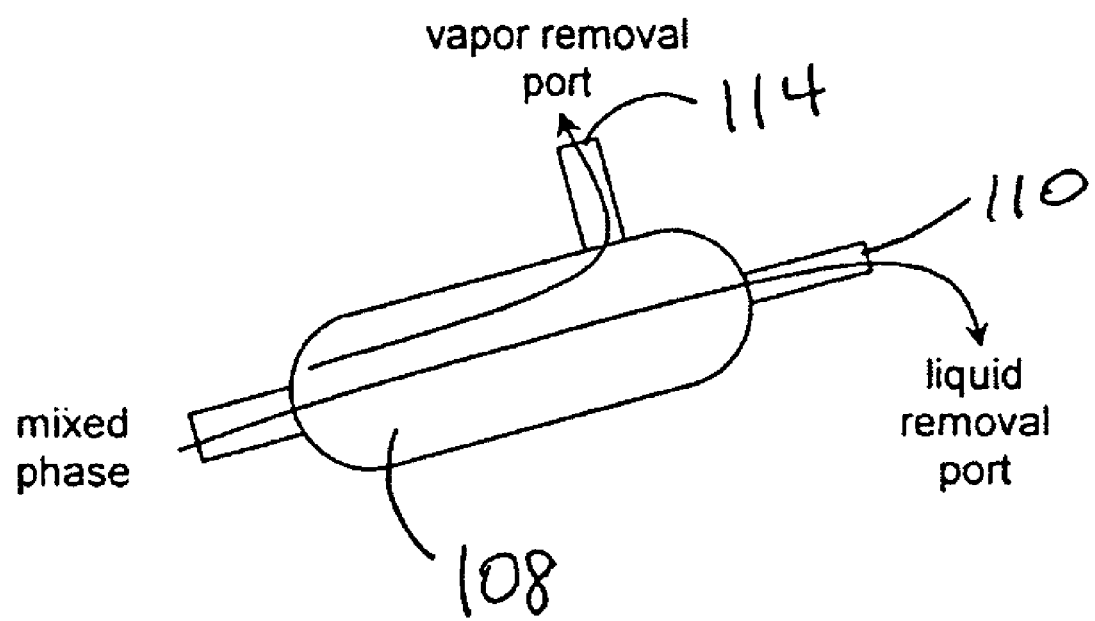
FIG. 17 is a diagram of an exemplary knock-out pot used in the exemplary microchannel device of FIG. 14.

Complete and fast purging of the knock out pot 108 is also important to obtaining response that reflects the instantaneous composition of the vapor stream exiting the channel. A knock-out pot 108 configuration was specifically put in place to help the purging process in the exemplary embodiment, as shown in FIG. 17. Gas and liquids flow co-currently through the knock-out pot 108, leading to minimal vapor backflow and most effective headspace purging. The headspace is also held as small as possible to minimize the purge rate. Because increased pressures lead to an increase in the vapor density and a corresponding reduction in vapor flow rate, the headspace purge rate decreases with increased pressure. When conducting the tests, consideration needs to be given to the fact that the system response time decreases as the test pressure increases.

The general procedure for continuous multi-phase flow testing may involve the steps outlined below. These do not include preliminary calibrations and system and valve setting checks required for safe and appropriate operation of the stand.

1. Fill the ambient water bath and ensure proper placement of the bath thermocouple. Turn on the bath mixer and set the water bath temperature.

2. Synchronize the date and time of the GC and Labview computers and start Labview recording.

3. Pressurize the system to the required downstream pressure using nitrogen gas.

4. Set the feed vapor flow rate to correspond to the sum of the intended gas feed flow rate and the expected vapor compensation flow rate (to compensate for gas displacement by the flowing liquid during operation).

5. Pre-regulate the back-pressure regulator and the needle valve on the knock-out pot to let the required amounts of vapor flow from each valve (this is a rough value that is refined once the test is started).

6. Switch the gas stream to the intended mix and reduce the vapor gas feed flow rate to the required setting for the testing.

7. Start feeding liquid to the stand, beginning with a flow rate that is less than 10% of the intended test value.

8. Gradually ramp the liquid flow rate to the required setting (ensuring that the upstream pressure does not exceed the predefined safe limit).

9. Allow enough time to fill the knockout pot with liquid to the minimum required level to prevent backflow of vapor from the collection vessel to the knockout pot via the liquid exit line. This also leads to a reduction in the headspace volume of the knock-out pot and a faster knock-out pot purge rate.

10. Refine the setting of the back pressure regulator and needle valve to ensure the proper flow distribution through the exit vapor stream lines (ensuring that all of the compensation gas displaced by the flowing liquid during operation is removed through the needle valve on the knock out pot and does not feed back into the GC line).

11. Measure the vapor stream concentrations periodically and frequently throughout the testing, allowing enough time for purging of the knock-out drum headspace and equilibration of the microchannel flow system (i.e., until no more changes in the exit stream concentrations are seen).

12. Re-measure feed compositions before shutting down the stand to double-check consistency and reproducibility of the GC measurements.

The effectiveness of any given experimental absorption run may be gauged by comparing the measured moles of each species absorbed/desorbed with the amount expected to have been absorbed/desorbed if complete saturation, as dictated by vapor-liquid equilibrium, defined with Henry's law, is achieved at the exit of the device.

Hence, the total molar flow rate and the inlet molar flow rates of each species in the system are calculated from the inlet liquid and vapor flow rates and compositions, as follows, $$\dot{Q} = \dot{L}_{inlet} + \dot{V}_{inlet} \tag{1}$$

$$(\dot{m}_i = x_i \dot{L} + y_i \dot{V})|_{inlet}, \text{ where} \tag{2}$$

$\dot{L}$, $\dot{V}$ = total liquid and vapor molar flow rates,
$\dot{m}_i$ = molar flow rate of species i through the system,
$\dot{Q}$ = total molar flow rate through the system,
$x_i$, $y_i$ = liquid and vapor mole fractions of species i.

The expected molar flow rates and species distributions at the exit point are calculated by simultaneous solution of the following equations:

$$\text{total mass balance, } \dot{L}_{exit} + \dot{V}_{exit} = \dot{Q} \tag{3}$$

$$\text{individual species mass balances, } (\dot{m}_i = x_i \dot{L} + y_i \dot{V})_{exit} \tag{4}$$

Henry's law for each species in the system, $$\left( H_i = \frac{P y_i}{x_i} \right)_{exit} \tag{5}$$

molar balances for all species in the vapor phase,
$$(\Sigma y_i = 1)_{exit} \tag{6}$$

molar balance for all species in the liquid phase,
$$(\Sigma x_i = 1)_{exit} \tag{7}$$

where the ionic liquid is assumed to be non-volatile. All other components can move into and out of each phase.

For easy implementation into a data-logger format, an Excel spreadsheet was specifically created for the calculations. Generally, it requires input of Henry's constants for each species, input of the initial vapor and liquid flow rates (in ccm and sccm, respectively), input of ambient and device inlet and outlet pressures and temperatures, input of GC measured inlet species concentrations in the vapor phase and appropriately measured inlet species concentrations in the liquid phase, and input of the vapor flow rate exiting the test stand through both the GC line and the knock-out drum.

This information is used to explicitly calculate the inlet values of $\dot{Q}$ and $\dot{m}_i$, using Equations 1 and 2. Equations 3 through 7 are solved simultaneously using the Excel "goal seek" tool. For this, the vapor mole fraction of each species at the exit point is calculated by rearranging Equations 3 through 7 in terms of $\dot{V}_{exit}$ and known variables, $$\left( y_i = \frac{\dot{m}_i}{\dot{V} + \frac{P\dot{Q}}{H_i} - \frac{P\dot{V}}{H_i}} \right)_{exit} \quad (8)$$

an initial value for the vapor exit flow rate, $\dot{V}_{exit}$, is selected (the inlet molar vapor flow rate is a good initial estimate) and let vary to satisfy Equation 6 (in the "goal seek" function), and the validity of Equation 7 is checked to ensure satisfaction of all conditions.

Finally, the effectiveness of the experimental absorption run for each species, $\xi_i$, is calculated with the following expression:

$$\xi_i = \frac{\left[ (y_i \dot{V})_{exit} - (y_i \dot{V})_{inlet} \right]_{measured}}{\left[ (y_i \dot{V})_{exit} - (y_i \dot{V})_{inlet} \right]_{calculated}} 100, \quad (9)$$

where $$\dot{V}_{exit\ measured} = \dot{V}_{exit\ GC} + \dot{V}_{exit\ KO\ drum} \quad (10)$$

A single flow through test run was completed to preliminarily gauge absorption performance and allow test protocol refinement. Mixing features were incorporated in the channel sidewalls to provide enhancement in interfacial mass transfer. A 96 wt % ionic liquid, 4 wt % water liquid mixture (whose absorption capacity was previously tested in the batch trials; ionic liquid code A) was adopted for methane absorption from a vapor stream containing nitrogen, methane and hydrogen gases. Addition of water to the ionic liquid reduces liquid viscosity, reducing the operating pressure drop. The vapor stream was fed at a constant flow rate; the liquid flow rate was varied to achieve different levels of absorption. Downstream pressure was varied to retain a relatively consistent feed pressure, not to exceed a predefined operational range. Testing was performed at room temperature. Pressure drop was measured for a variety of liquid flow rates. The extent of absorption was measured for two liquid flows. The assumed Henry's constants for each species and the absorption test results are summarized in Table 5. Pressure drop profiles are plotted in FIG. 18.

TABLE 5

| | | |
|---|---|---|
| bath temperature, ° C. | 20 | 20 |
| vapor feed flow rate, sccm | 100 | 100 |
| liquid feed flow rate, ccm | 6 | 8 |
| feed pressure, psig | 313 | 309 |
| knock out drum pressure, psig | 246 | 221 |

TABLE 5-continued

| | assumed $H_i$ bar/mol fraction | measured vapor concentration, mol fraction | | |
|---|---|---|---|---|
| | | feed | exit | feed | exit |
| N2 | 20,000 | 0.030 | 0.048 | 0.030 | 0.034 |
| H2 | 20,000 | 0.900 | 0.899 | 0.900 | 0.891 |
| CH4 | 766 | 0.080 | 0.076 | 0.080 | 0.074 |
| % of maximum CH4 absorption capacity | | 42 | | 31 | |

Figure 18:
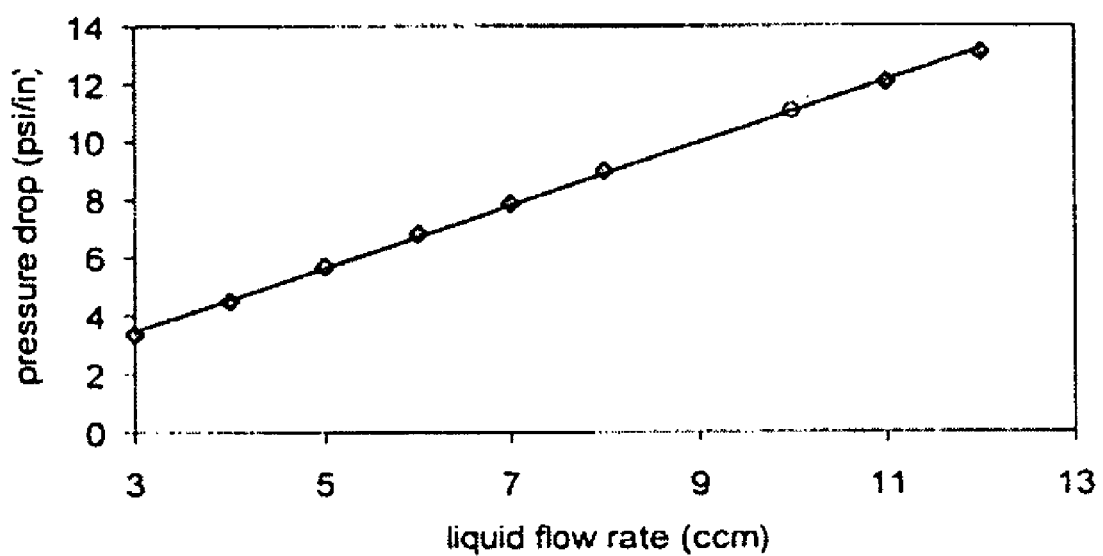
FIG. 18 is a plot of pressure drop versus liquid flow rate for 100 sccm vapor and varying liquid flow rates.

As shown in FIG. 18, at the flow rates considered, pressure drop increases linearly with increasing liquid flow rate. This dependence may be indicative of a relatively laminar flow profile, attributable to the very small vapor and liquid flows adopted in these preliminary trials. As tabulated in Table 5, increased liquid flow rates at these operating conditions led to decreased absorption efficiency but increased methane absorption.

Preliminary absorption trials involving co-currently flowing vapor and liquid absorbent streams were performed using the exemplary microchannel test stand. The absorption capacity varied between 31 and 42% of the theoretical capacity as determined by the previous batch experiments.

Increasing interfacial area may improve effective mass transfer across phases. The use of ionic liquids for preferential absorption of species from a vapor stream is exemplary of the type of process that can benefit from enhancements obtainable by processing on the micro-scale. Because species diffusivity through the liquid phase is relatively low, reduced diffusion thicknesses can have a significant impact on process effectiveness.

In an exemplary process involving absorption of a 1000 sccm pure methane vapor stream into a [hmim][FAP] ionic liquid stream with a Henry's constant of 230 bar/mole fraction, one can expect to be able to absorb 100% of the methane (at room temperature and under a driving force of 10 atm) by flowing the liquid (with a density of 1.56 g/cc) at a flow rate of 268 ccm. For a given set of feed stream compositions, counter-current operation may lead to increased driving force for mass transfer, but counter-current flooding limits may reduce the window of operation and make processing in co-current mode more flexible and practical.

A rough estimate of co-current and counter-current performance can be made by disregarding the reduction in vapor flow with absorption, assuming liquid-side dominated mass transfer, an overall mass transfer coefficient, $K_L a$, and a pressure drop that are not impacted by flow direction, and the following expression for the rate of species absorption, $r_i$, $$r_i = K_L a (C_i^* - C_i)_{log\ mean}$$

where $C_i^*$ and $C_i$ are the absorbed species concentrations at the liquid interface and in the bulk, respectively. The log mean values relate to the differences at the liquid inlet and outlet ports.

For a 10 atm driving force, a 0.7 atm pressure drop along the liquid flow direction, a 0.8 absorption efficiency (ratio of the absorbed species concentration in the liquid at the exit port to the maximum achievable absorbed species concentration in the liquid), counter-current operation leads to twice the driving force of co-current operation. The less than order of magnitude enhancement and the decreased capacity of counter-current operation may warrant the adoption of co-current flow.

Processing through solid foams may provide a significant reduction in pressure drop relative to processing through packed beds. Because of their relatively high pure fluid viscosity, ionic liquid processing stands to gain from the use of such high porosity, microscale structures that help maximize interaction while minimizing pressure drop and pumping power needs.

The literature shows gas and liquid flow (air and water) over isothermal foams to measure the interfacial surface area. The use of foams as an absorbent media for preferentially separating one solute from another is not discussed, nor is the use of a system including absorption and desorption.

The exemplary embodiments described here may include the use of a system to absorb at least one or more solutes at one temperature or temperature range and desorb said solutes at a second temperature or temperature range.

In conjunction with ionic liquids, the solid foam approach is being adopted for carbon sequestration, for example. Devices are described to incorporate and evaluate absorption performance in configurations that allow eventual numbering up to industrial scales. The devices have been designed to allow variable foam stacking lengths, ensuring direct contacting of the cut foams. Because appropriate distribution and interaction of the phases throughout the flow path are contingent on appropriate feed configurations, vapor and liquid entrance ports have been incorporated to bring the independent streams in direct contact with the beginning of the foam stack, for example. Cylindrical and rectangular process channel configurations allow the use of diverse foam cross sections, to accommodate different foam cutting needs and pore densities. Liquid and vapor feed streams alternate or intertwine to aid distribution across the whole cross section. Stacks of foams of different porosities, materials, and structures can be incorporated in the same device to provide varying processing effects. Readily available foams include aluminum, carbon, copper, nickel, stainless steel, silicon carbide, among others. Good wetting of the foam by the liquid stream is important to effective performance. In the case of absorption, the foam needs to be inert, serving only to facilitate flow and phase distribution. If the devices are to accommodate heterogeneous reactions, foam functionalization can allow for relatively easy catalyst integration and regeneration or replacement.

In other exemplary embodiments, the foams are also activated with a catalyst or other agent that acts upon the solutes sorbed in the liquid wetted to the activated foam structure. This embodiment would allow more time for a reactive solute to interact with the liquid and activated foam or continuous and porous solid than would be enabled if the solute remained in the gaseous phase. The gaseous phase typically has a shorter residence time in the reaction media. In this embodiment, one or more solutes is preferentially sorbed in a liquid over one or more alternate solutes that are not sorbed or much less strongly sorbed in the liquid sorbent phase.

Figure 19:
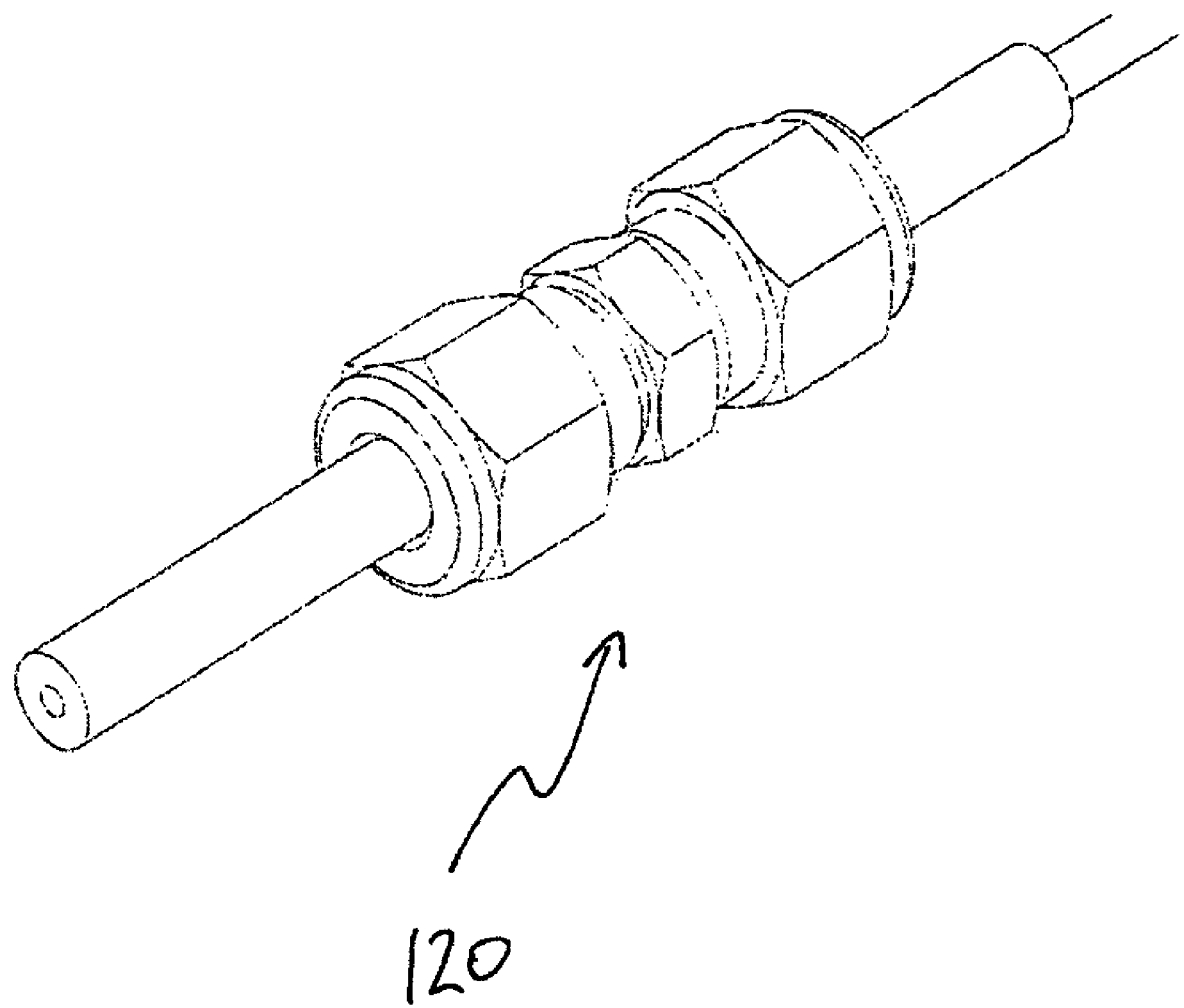
FIG. 19 is an isometric view of an exemplary solid foam processing device.
Figure 20:
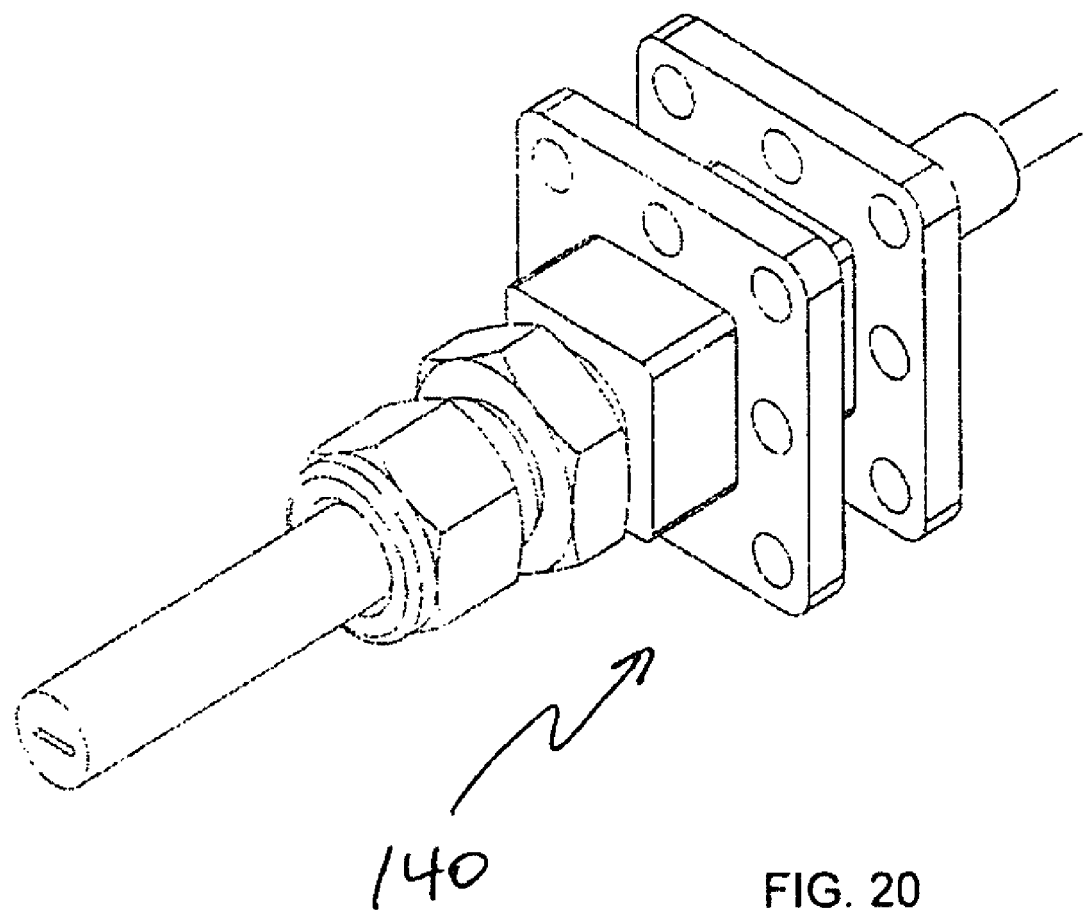
FIG. 20 is an isometric view of an alternative exemplary solid foam processing device.

Two exemplary device configurations, incorporating cylindrical 120 and rectangular 140 flow cross-sections, are shown in FIGS. 19 and 20 and in greater detail in FIGS. 21-26. The depicted exemplary configurations accommodate co-current flows and reflect relatively short foam stacking lengths.

Figure 21:
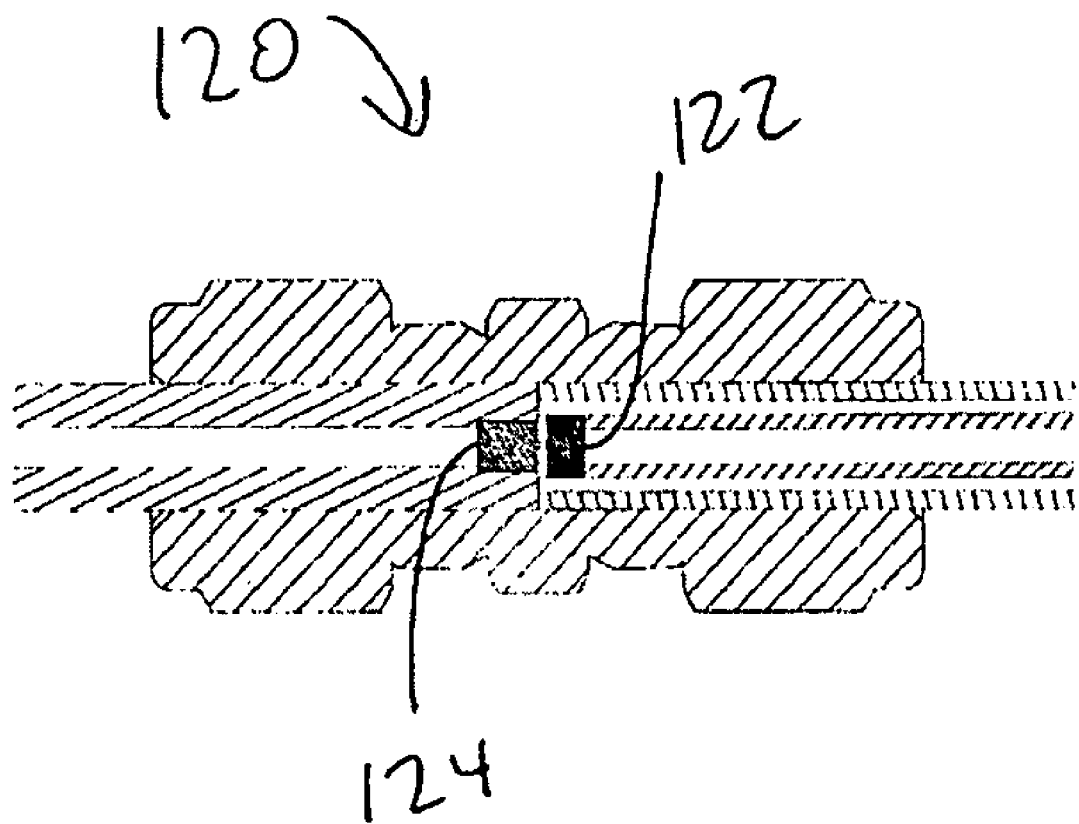
FIG. 21 is a cross-sectional view of an exemplary feed port assembly.
Figure 22:
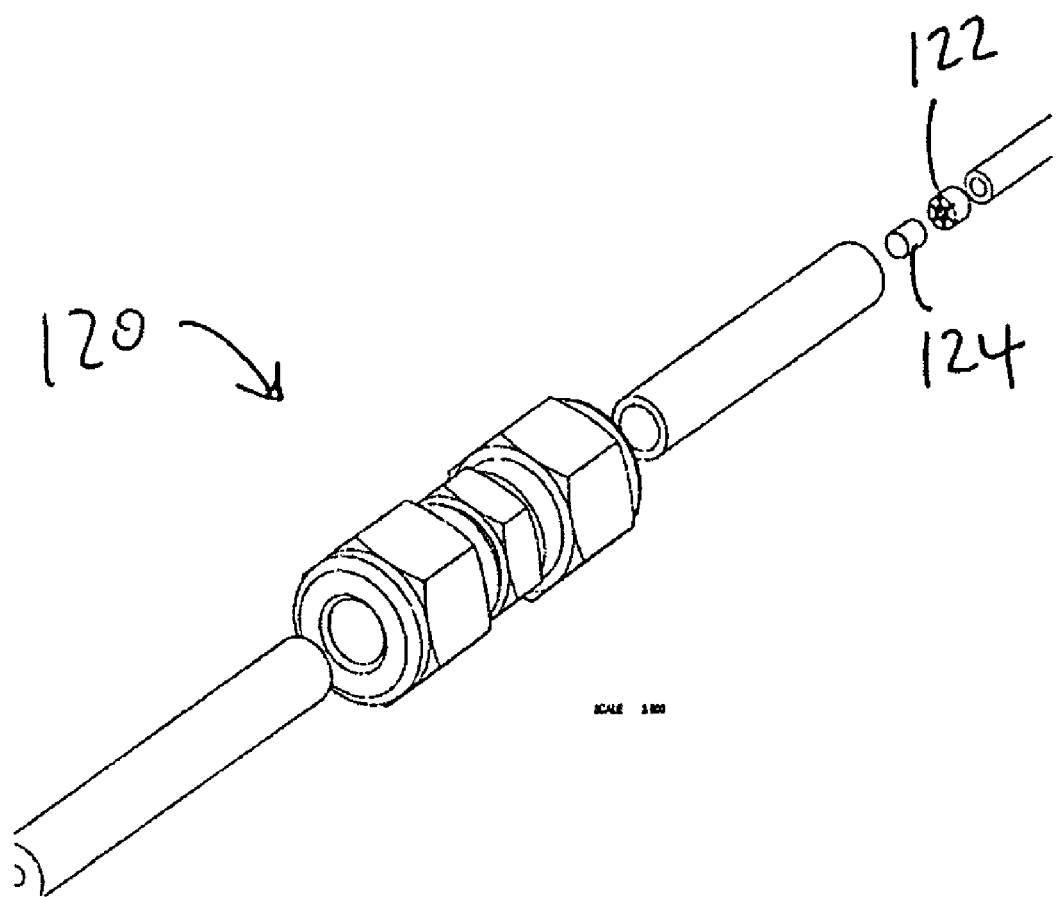
FIG. 22 is an exploded isometric view of an exemplary feed port assembly.
Figure 23:
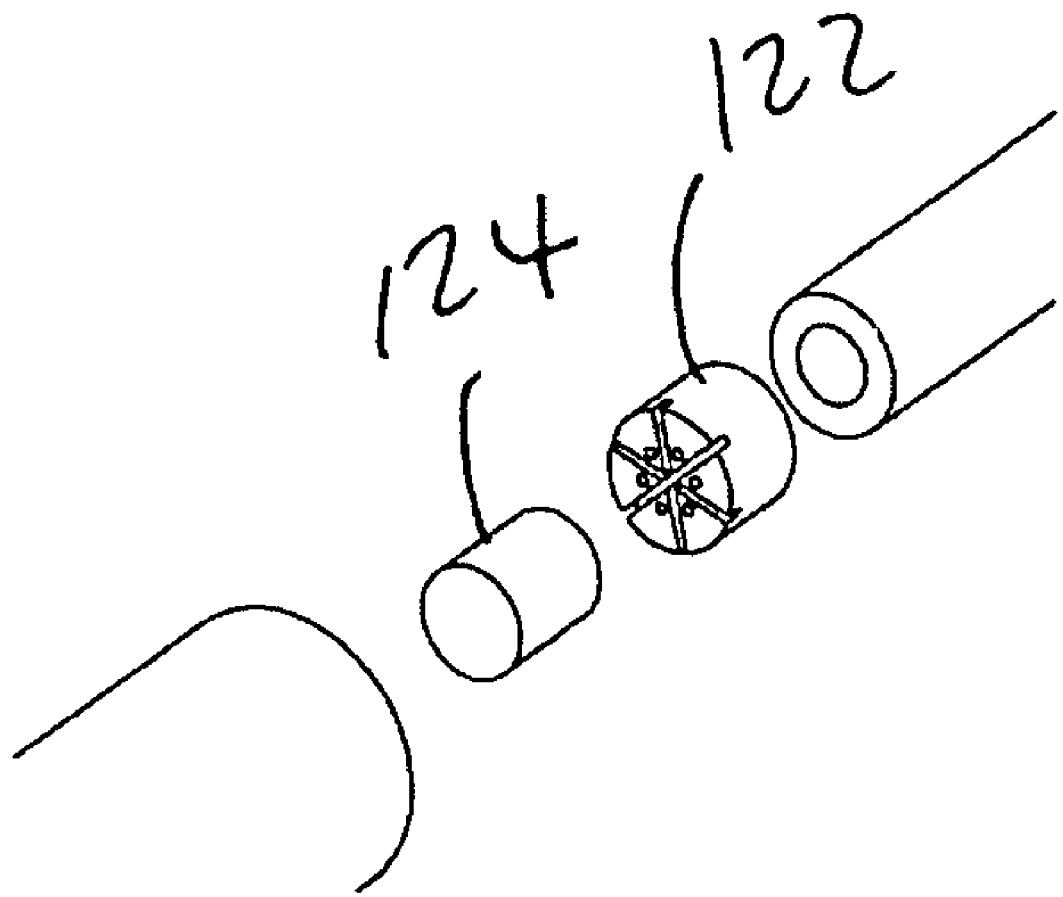
FIG. 23 is an exploded isometric view of an exemplary feed port assembly.

As shown in FIGS. 21-23, a multiphase manifold 122 may be attached upstream of the foam 124 to spread the liquid across the face of the foam 124 and concurrently touch the foam 124 to prevent a head space where two phases may recombine upstream of the foam. This multiphase manifold 122 may improve the uniformity of wetting and distribution of liquid across the surface of the foam 124.

Figure 24:
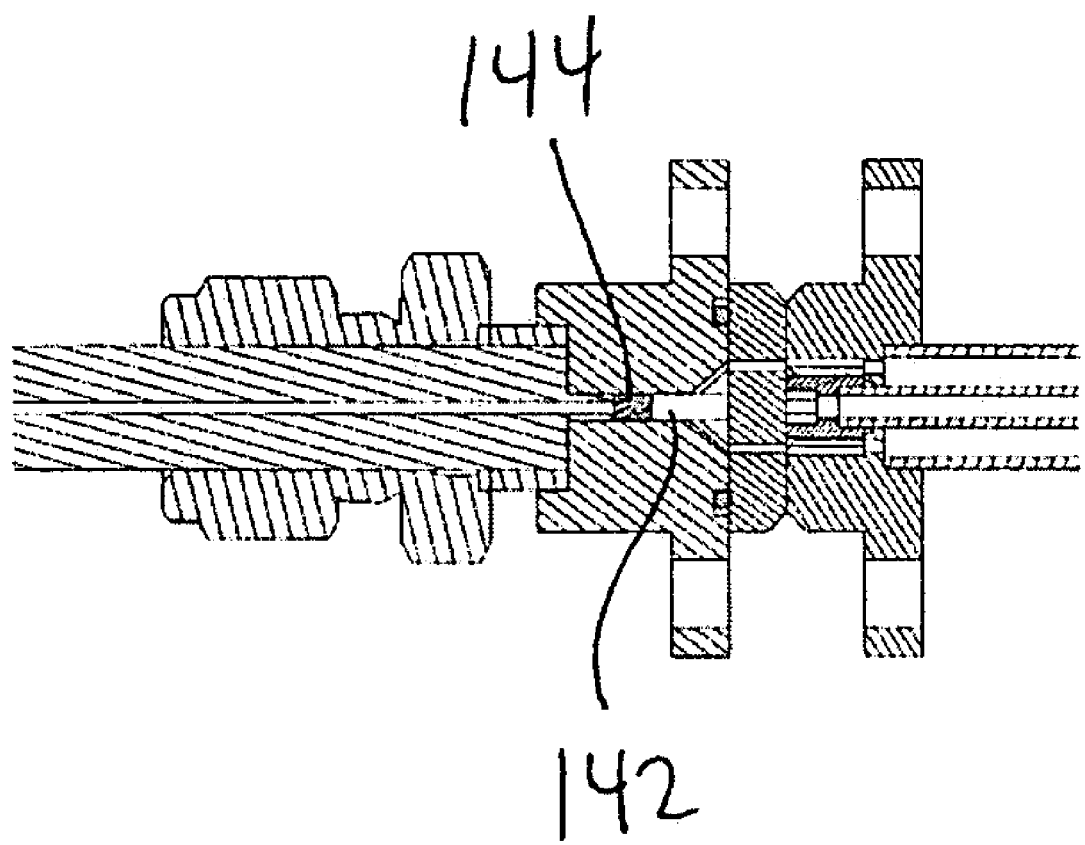
FIG. 24 is a cross-sectional view of an alternative exemplary feed port assembly.
Figure 25:
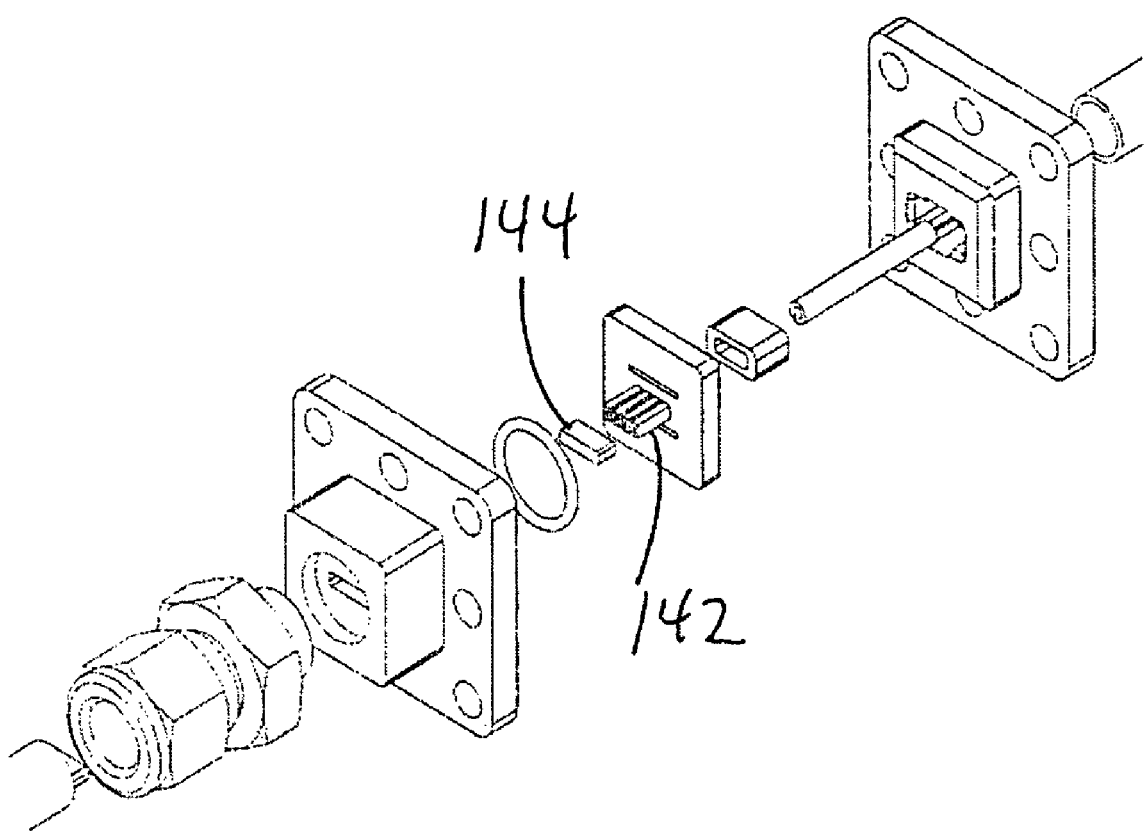
FIG. 25 is an exploded isometric view of an alternative exemplary feed port assembly.
Figure 26:
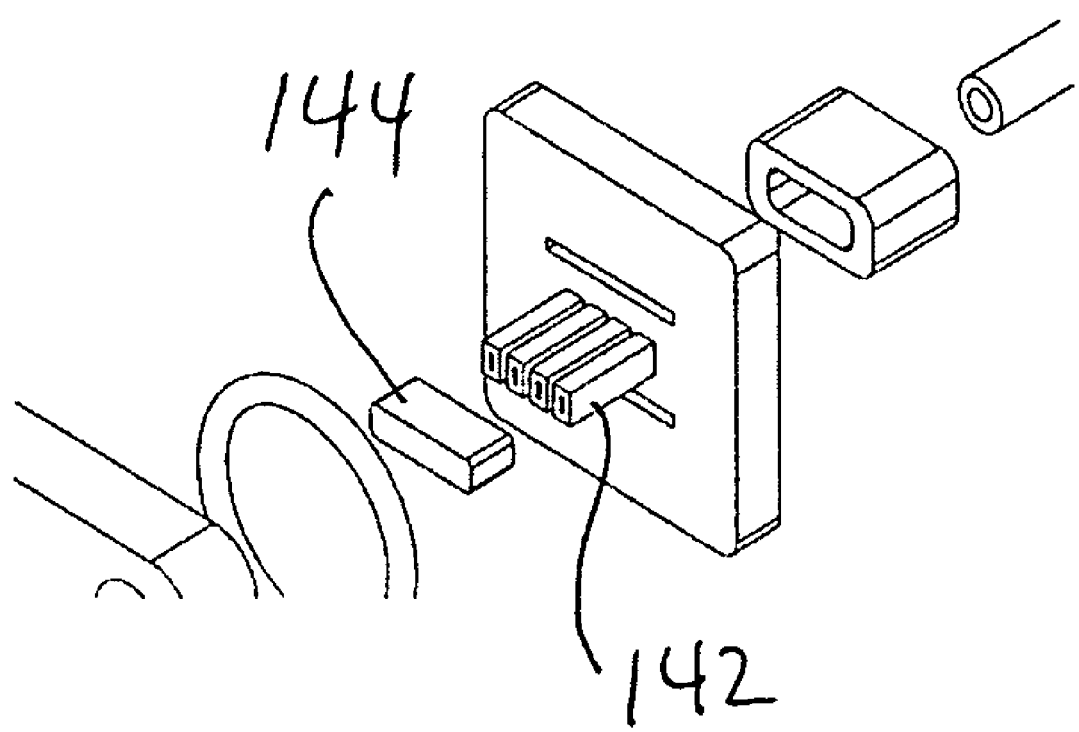
FIG. 26 is a detailed exploded isometric view of an alternative exemplary feed port assembly.

In the multiphase manifold 142 as shown in FIGS. 24-26 the above figure, the gas and liquid fluids are kept separated until they contact the foam 144 or connected porous media substrate. This substantially prevents the two phases from mixing prior to flowing into the connected porous media or foam 144.

Figure 27:
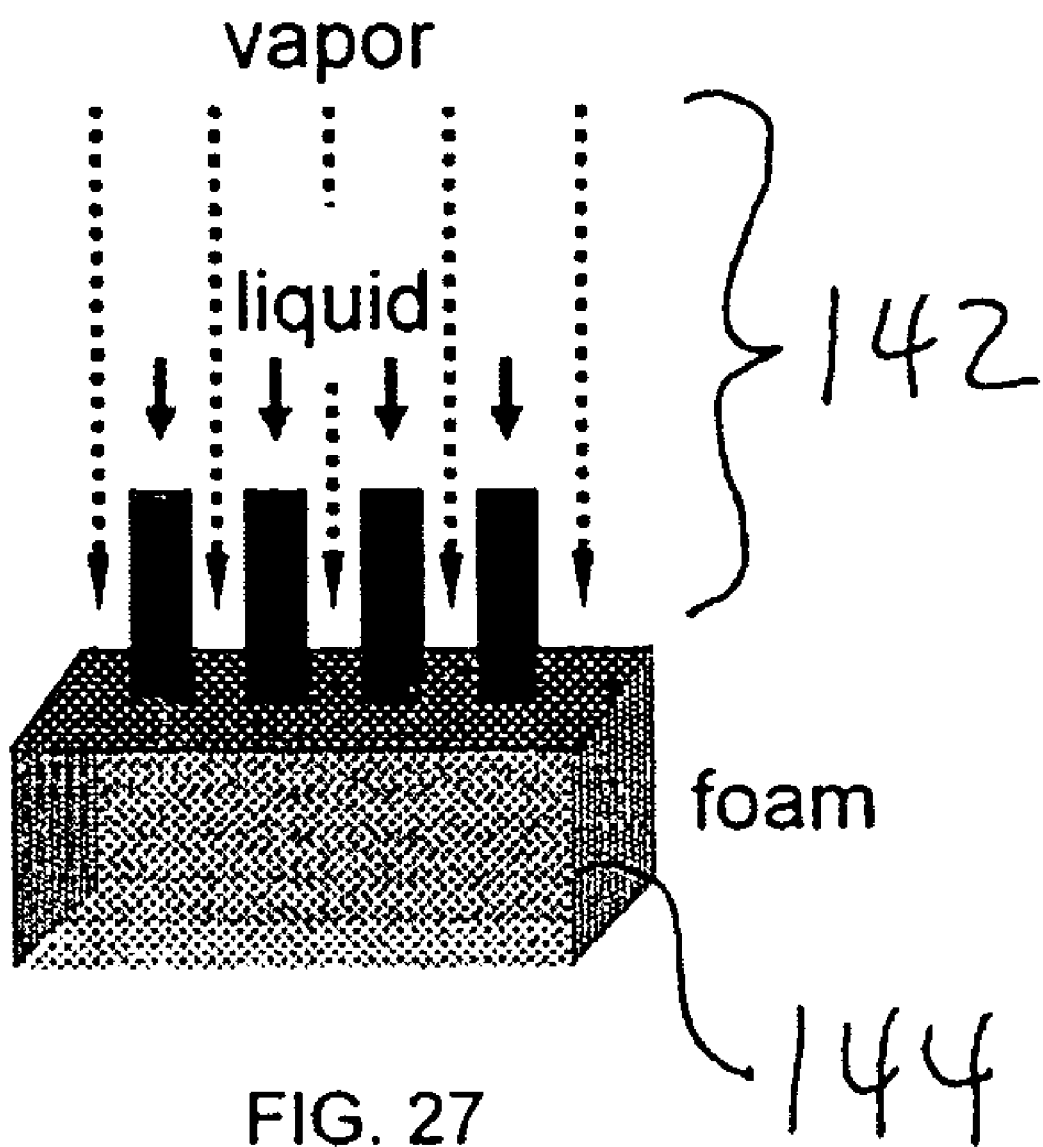
FIG. 27 is a diagram of an exemplary multiphase manifold where the liquid inlet is substantially in contact with the foam or the continuous connected porous media.

FIG. 27 depicts an example of the multiphase manifold 142 where the liquid inlet is substantially in contact with the foam 144 or the continuous connected porous media.

While exemplary embodiments of the invention have been set forth above for the purpose of disclosure, modifications of the disclosed embodiments of the invention as well as other embodiments thereof may occur to those skilled in the art. Accordingly, it is to be understood that the inventions contained herein are not limited to the above precise embodiments and that changes may be made without departing from the scope of the invention. Likewise, it is to be understood that it is not necessary to meet any or all of the stated advantages or objects of the invention disclosed herein to fall within the scope of the invention, since inherent and/or unforeseen advantages of the present invention may exist even though they may not have been explicitly discussed herein. All references mentioned herein are incorporated by reference.

What is claimed is:

1. A method for separating gaseous components comprising the steps of:
   contacting a gaseous mixture including methane with an ionic liquid by flowing the gaseous mixture and the ionic liquid through a microchannel;
   absorbing at least a portion of the methane of the gaseous mixture by the ionic liquid, thereby creating a resultant mixture including a resultant gas and the ionic liquid;
   directing the resultant gas away from the ionic liquid; and
   desorbing at least a portion of the methane from the ionic liquid by changing the temperature of the ionic liquid.

2. The method of claim 1, wherein the step of desorbing at least a portion of the methane includes raising the temperature of the ionic liquid.

3. The method of claim 1, wherein the step of desorbing at least a portion of the Methane includes lowering the temperature of the ionic liquid.

4. The method of claim 1, wherein the step of desorbing at least a portion of the methane includes lowering the pressure of the ionic liquid.

5. The method of claim further comprising the step of changing the temperature of the ionic liquid prior to the step of absorbing at least a portion of the methane.

6. The method of claim 1, wherein the step of desorbing at least a portion of methane includes raising the pressure of the ionic liquid.

7. The method of claim 6, wherein the step of changing the temperature of the ionic liquid includes lowering the temperature of the ionic liquid.

8. The method of claim 6, wherein the step of changing the temperature of the ionic liquid includes raising the temperature of the ionic liquid.

9. The method of claim 6, wherein thermal energy extracted from the ionic liquid in one of the desorbing and changing the temperature steps is supplied to the ionic liquid in the other of the desorbing and changing the temperature steps.

10. The method of claim 1, wherein the microchannel includes at least one flow mixing feature.

11. The method of claim 10, wherein the flow mixing feature includes a porous packed bed including at least one of rings and spheres.

12. The method of claim 10, wherein the flow mixing feature includes at least one of a porous foam, felt, wad and other porous structure continuous for at least a length greater than a length of three hydraulic, diameters of the microchannel, wherein the porosity is less than one.

13. The method of claim 1, wherein the contacting step includes flowing the gaseous mixture and the ionic liquid co-currently through the microchannel.

14. The method of claim 1, wherein the contacting step includes flowing the gaseous mixture counter-currently to the ionic liquid through the microchannel.

15. The method of claim 1, wherein the microchannel includes at least one of a foam, wad, and mesh.

16. The method of claim 15, wherein the flowing step includes wetting the foam, wad, or mesh with the ionic liquid.

17. The method of claim 15, wherein the microchannel includes a foam constructed from at least one of aluminum, carbon, copper, nickel, stainless steel, and silicon carbide.

18. The method of claim 15, wherein the microchannel includes a foam coated with a material to increase the wetting over the underlying material.

19. The method of claim 15, wherein the microchannel includes a plurality of foams having different pore densities.

20. The method of claim 1, wherein the gaseous mixture includes methane and nitrogen.

21. The method of claim 20, wherein the resultant gas includes nitrogen.

22. The method of claim wherein the gaseous mixture includes carbon dioxide.

* * * * *

UNITED STATES PATENT AND TRADEMARK OFFICE
CERTIFICATE OF CORRECTION

PATENT NO.         : 8,029,604 B2                                   Page 1 of 1
APPLICATION NO.    : 12/184843
DATED              : October 4, 2011
INVENTOR(S)        : Anna Lee Y. Tonkovich et al.

It is certified that error appears in the above-identified patent and that said Letters Patent is hereby corrected as shown below:

On the Title Page, Item (75) left hand column after "Inventors:" change the following inventor name from "Qiu Dongming" to "Dongming Qiu"

Signed and Sealed this
Twenty-second Day of November, 2011

David J. Kappos
*Director of the United States Patent and Trademark Office*